US012592748B2

(12) United States Patent
Sahraei et al.

(10) Patent No.: US 12,592,748 B2
(45) Date of Patent: Mar. 31, 2026

(54) RECONFIGURABLE INTELLIGENT SURFACE OPTIMIZATION AND CONTROL SIGNALING

(71) Applicant: QUALCOMM Incorporated, San Diego, CA (US)

(72) Inventors: Saeid Sahraei, San Diego, CA (US); Yu Zhang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 41 days.

(21) Appl. No.: 18/727,589

(22) PCT Filed: Mar. 30, 2022

(86) PCT No.: PCT/CN2022/084031
    § 371 (c)(1),
    (2) Date: Jul. 9, 2024

(87) PCT Pub. No.: WO2023/184225
    PCT Pub. Date: Oct. 5, 2023

(65) Prior Publication Data
    US 2025/0088220 A1    Mar. 13, 2025

(51) Int. Cl.
    *H04B 7/04*        (2017.01)
    *H04B 7/06*        (2006.01)
(52) U.S. Cl.
    CPC ....... *H04B 7/04013* (2023.05); *H04B 7/0617* (2013.01)
(58) Field of Classification Search
    CPC ..................... H04B 7/040413; H04B 7/0617
    See application file for complete search history.

(56) References Cited

U.S. PATENT DOCUMENTS

2019/0181560 A1*  6/2019  Sridharan ................ H01Q 3/46
2021/0058137 A1*  2/2021  Shahvirdi Dizaj Yekan ...............
                                                          H01Q 3/16
(Continued)

FOREIGN PATENT DOCUMENTS

CN        111245494 A      6/2020
CN        111901014 A      11/2020
(Continued)

OTHER PUBLICATIONS

Ericsson: "Codebook Based Transmission with Multiple SRI", 3GPP TSG-RAN WG1 #91, R1-1720716, Reno, USA, Nov. 27-Dec. 1, 2017, Nov. 18, 2017, pp. 1-5, the whole document.
(Continued)

*Primary Examiner* — Sung S Ahn
(74) *Attorney, Agent, or Firm* — Holland & Hart LLP

(57)            ABSTRACT

Methods, systems, and devices for wireless communications are described. A first device may include reflective elements and may reflect signals between a second and third device using the reflective elements. In some cases, the first device may receive signaling from the second device indicating a first subset of the reflective elements corresponding to a first phase configuration and a second subset of the reflective elements corresponding to a second phase configuration. In some other cases, the first device may receive signaling indicating a transmission beam of the second device. Here, the first device may identify the first and second subsets of the reflective elements based on an angle of arrival and departure associated with the indicated transmission beam. In either case, the first device may set the phase configurations of the reflective elements according to the first and second subsets.

30 Claims, 24 Drawing Sheets

(56)        References Cited

U.S. PATENT DOCUMENTS

| | | | |
|---|---|---|---|
| 2022/0014935 A1 | 1/2022 | Haija et al. | |
| 2023/0041198 A1 | 2/2023 | Chen et al. | |
| 2023/0180020 A1* | 6/2023 | Gurelli | H04W 16/28 |
| | | | 370/329 |

FOREIGN PATENT DOCUMENTS

| | | |
|---|---|---|
| CN | 113905394 A | 1/2022 |
| WO | WO-2008050193 A2 | 5/2008 |
| WO | WO-2020254030 A1 | 12/2020 |
| WO | WO-2021221603 A1 | 11/2021 |
| WO | WO-2021239259 A1 | 12/2021 |
| WO | WO-2023024401 A1 | 3/2023 |

OTHER PUBLICATIONS

International Search Report and Written Opinion—PCT/CN2022/084031—ISA/EPO—Nov. 29, 2022.
Supplementary Partial European Search Report—EP22934077—Search Authority—Munich—Jan. 28, 2026.

* cited by examiner 310-a 300-a 310-b 300-b

| Subset Signaling Receiver | | Reflection Component |
| 825 | | 830 |
| Transmission Beam Component | | Subset Identifier |
| 835 | | 840 |
| Capability Component | | Ratio Value Component |
| 845 | | 850 |

820

800

1010

1020

1015

1005

1000

130

105

115

Network
Entity

Transceiver

1310

Antenna

1315

Communications
Manager

1320

Memory

Code

1330

1325

1340

Processor

1335

1305

Figure 14:
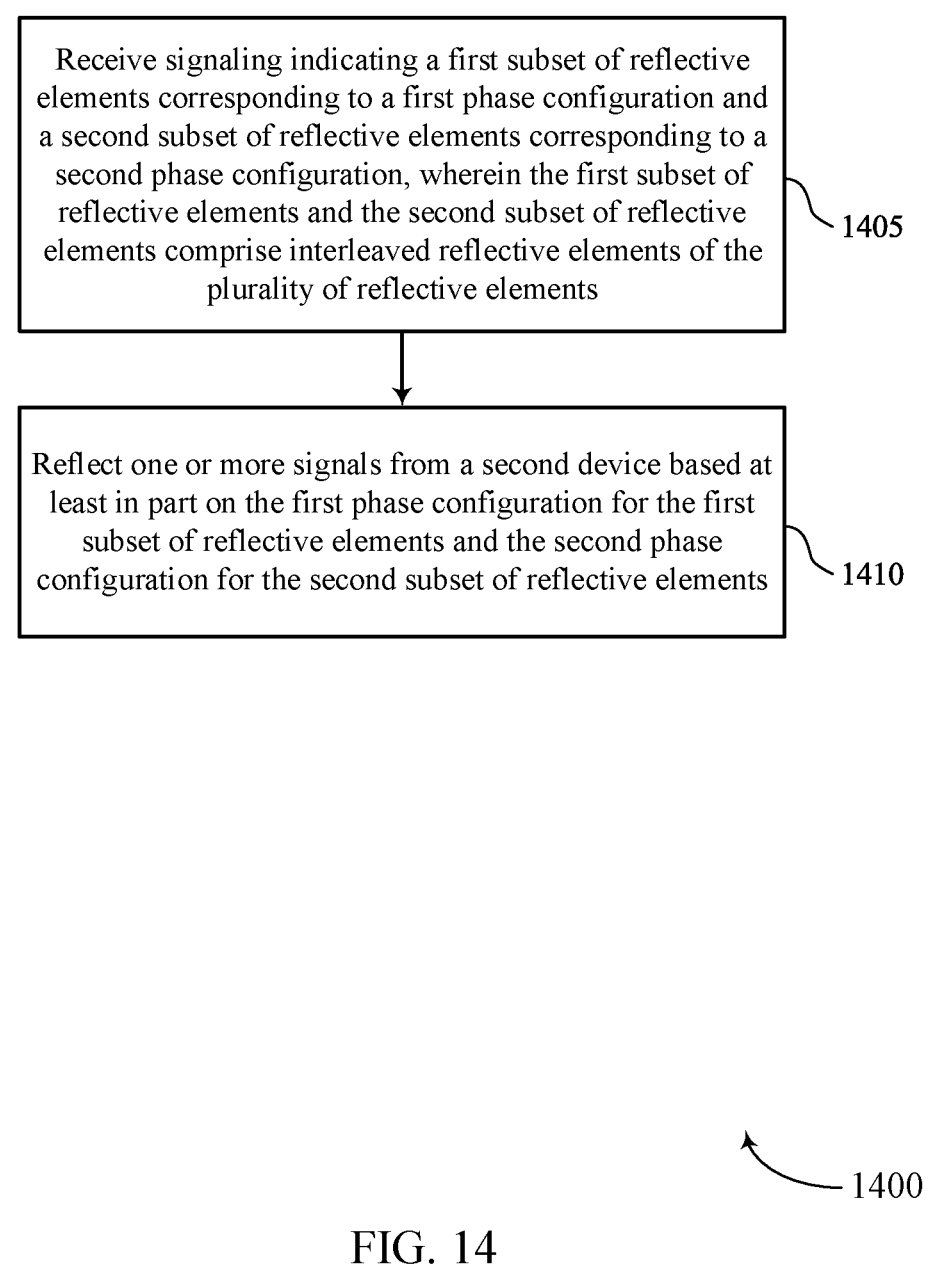

Receive signaling indicating a first subset of reflective
elements corresponding to a first phase configuration and
a second subset of reflective elements corresponding to a
second phase configuration, wherein the first subset of
reflective elements and the second subset of reflective
elements comprise interleaved reflective elements of the
plurality of reflective elements

1405

Reflect one or more signals from a second device based at
least in part on the first phase configuration for the first
subset of reflective elements and the second phase
configuration for the second subset of reflective elements

Figure 15:
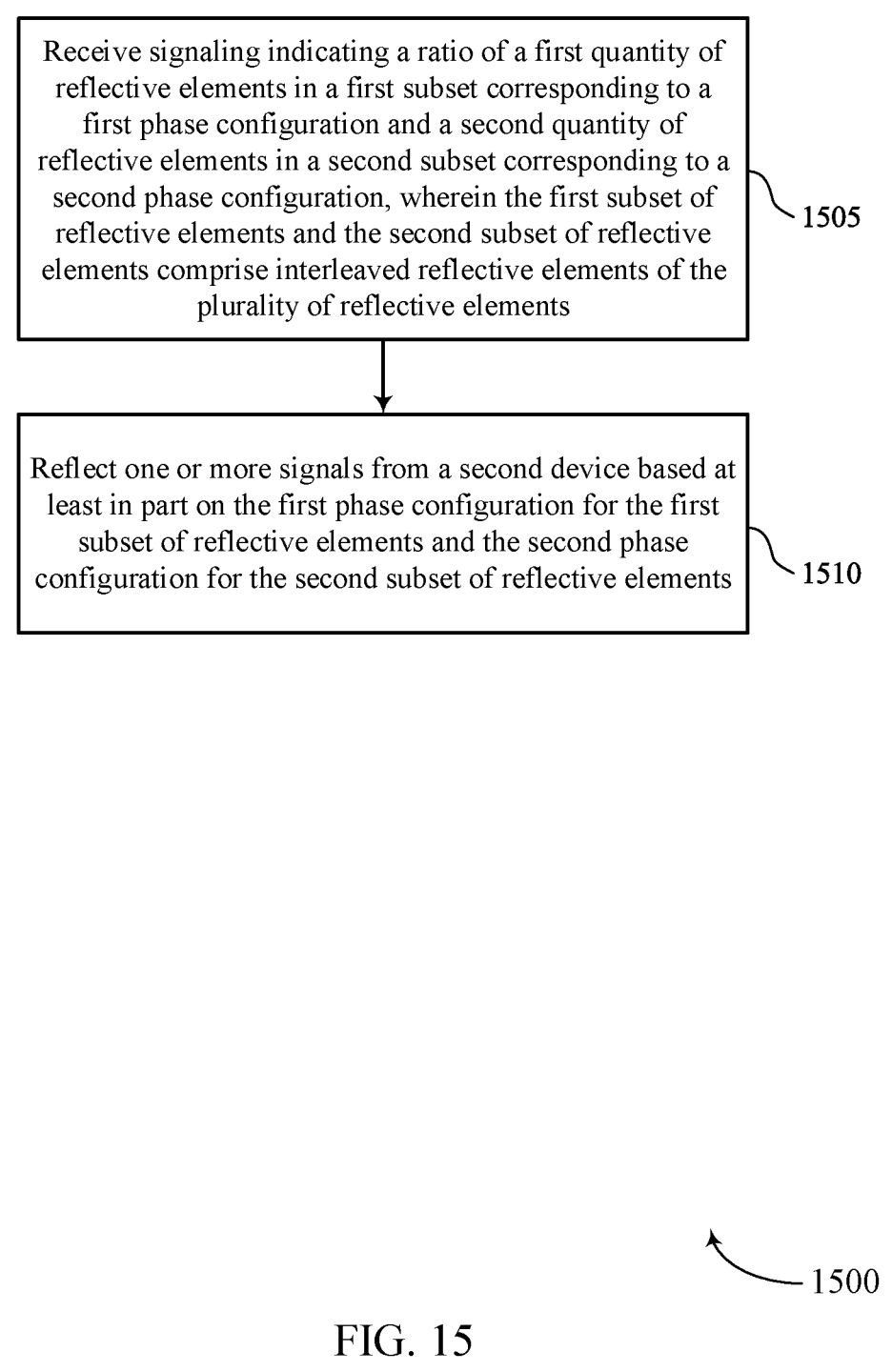

Receive signaling indicating a ratio of a first quantity of reflective elements in a first subset corresponding to a first phase configuration and a second quantity of reflective elements in a second subset corresponding to a second phase configuration, wherein the first subset of reflective elements and the second subset of reflective elements comprise interleaved reflective elements of the plurality of reflective elements

1505

Reflect one or more signals from a second device based at least in part on the first phase configuration for the first subset of reflective elements and the second phase configuration for the second subset of reflective elements

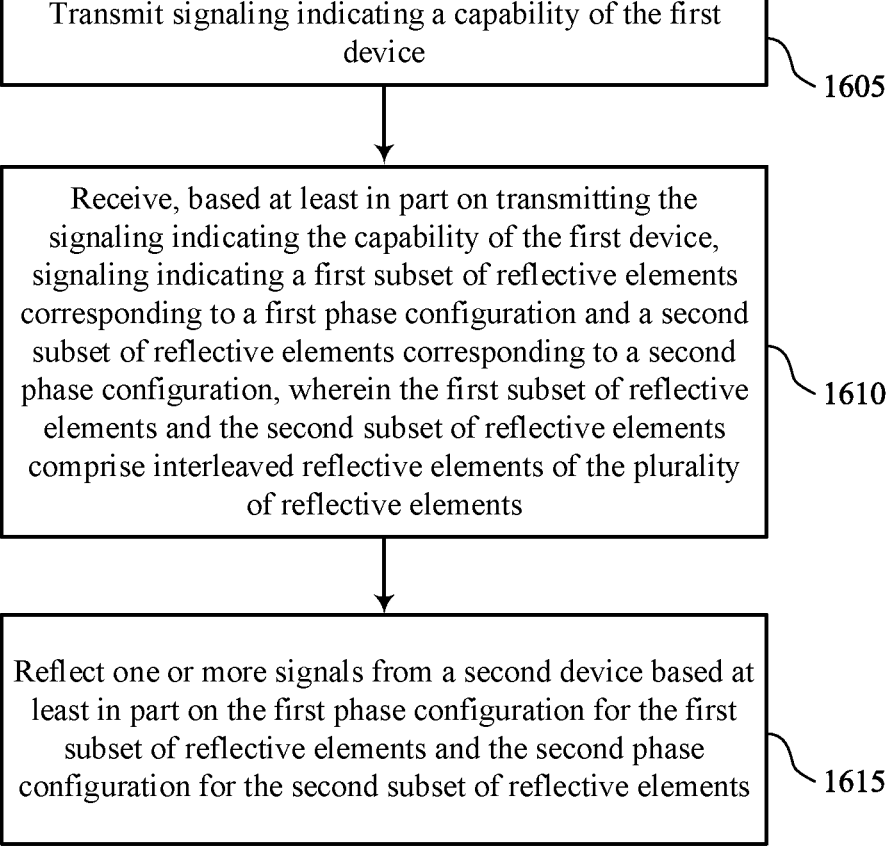

| Transmit signaling indicating a capability of the first device |
|---|

1605

| Receive, based at least in part on transmitting the signaling indicating the capability of the first device, signaling indicating a first subset of reflective elements corresponding to a first phase configuration and a second subset of reflective elements corresponding to a second phase configuration, wherein the first subset of reflective elements and the second subset of reflective elements comprise interleaved reflective elements of the plurality of reflective elements |
|---|

1610

| Reflect one or more signals from a second device based at least in part on the first phase configuration for the first subset of reflective elements and the second phase configuration for the second subset of reflective elements |
|---|

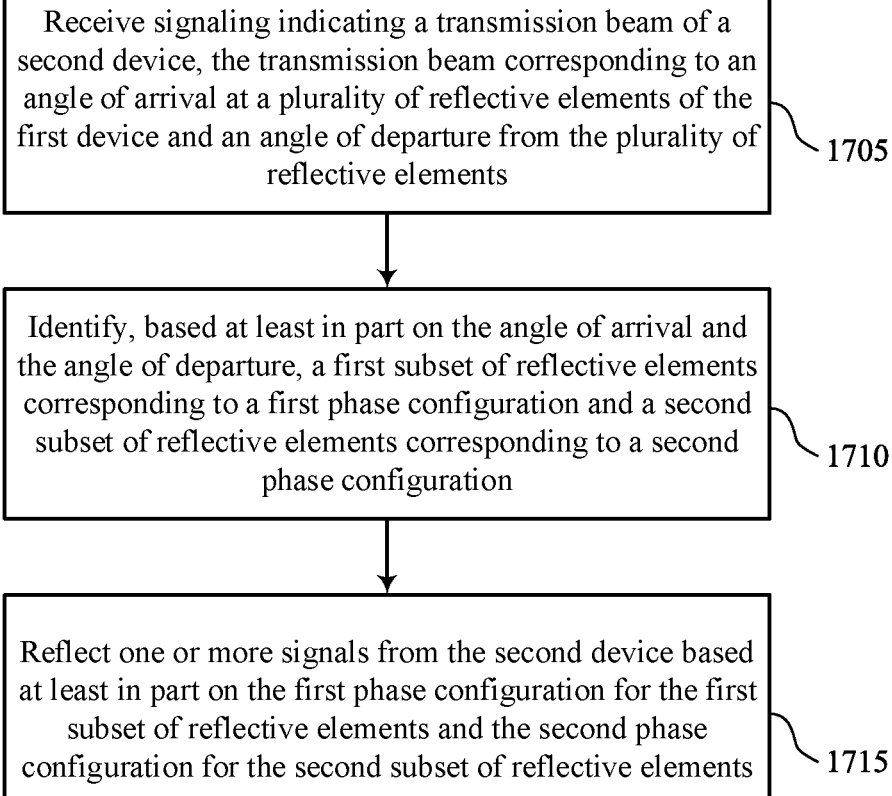

Receive signaling indicating a transmission beam of a second device, the transmission beam corresponding to an angle of arrival at a plurality of reflective elements of the first device and an angle of departure from the plurality of reflective elements

1705

Identify, based at least in part on the angle of arrival and the angle of departure, a first subset of reflective elements corresponding to a first phase configuration and a second subset of reflective elements corresponding to a second phase configuration

1710

Reflect one or more signals from the second device based at least in part on the first phase configuration for the first subset of reflective elements and the second phase configuration for the second subset of reflective elements

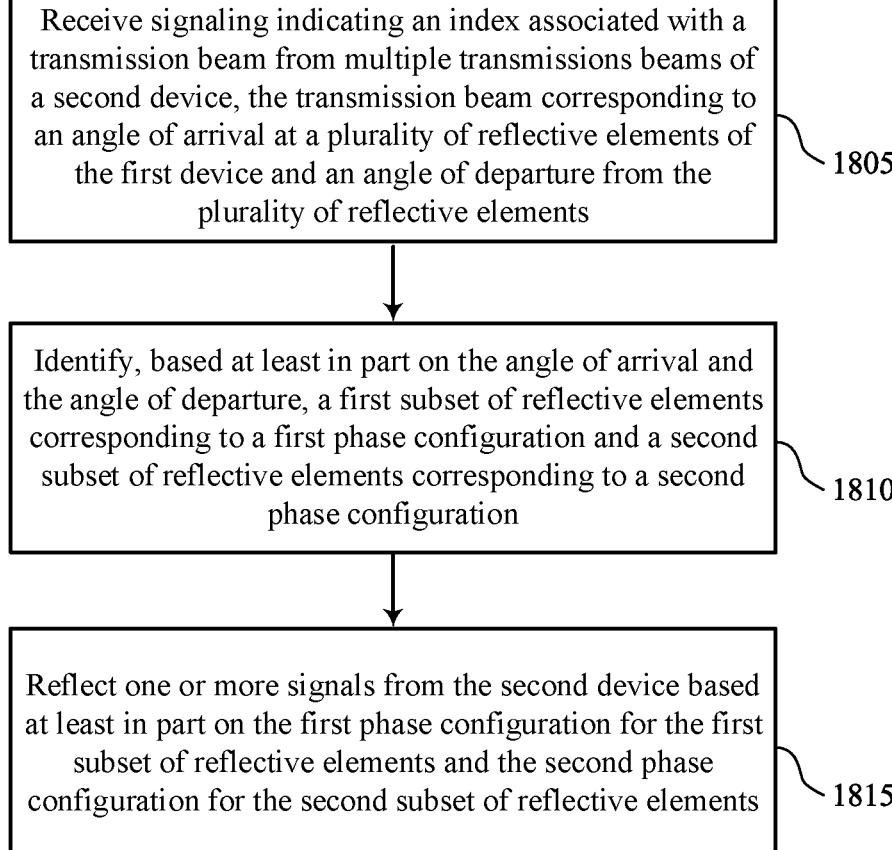

Receive signaling indicating an index associated with a transmission beam from multiple transmissions beams of a second device, the transmission beam corresponding to an angle of arrival at a plurality of reflective elements of the first device and an angle of departure from the plurality of reflective elements

1805

Identify, based at least in part on the angle of arrival and the angle of departure, a first subset of reflective elements corresponding to a first phase configuration and a second subset of reflective elements corresponding to a second phase configuration

1810

Reflect one or more signals from the second device based at least in part on the first phase configuration for the first subset of reflective elements and the second phase configuration for the second subset of reflective elements

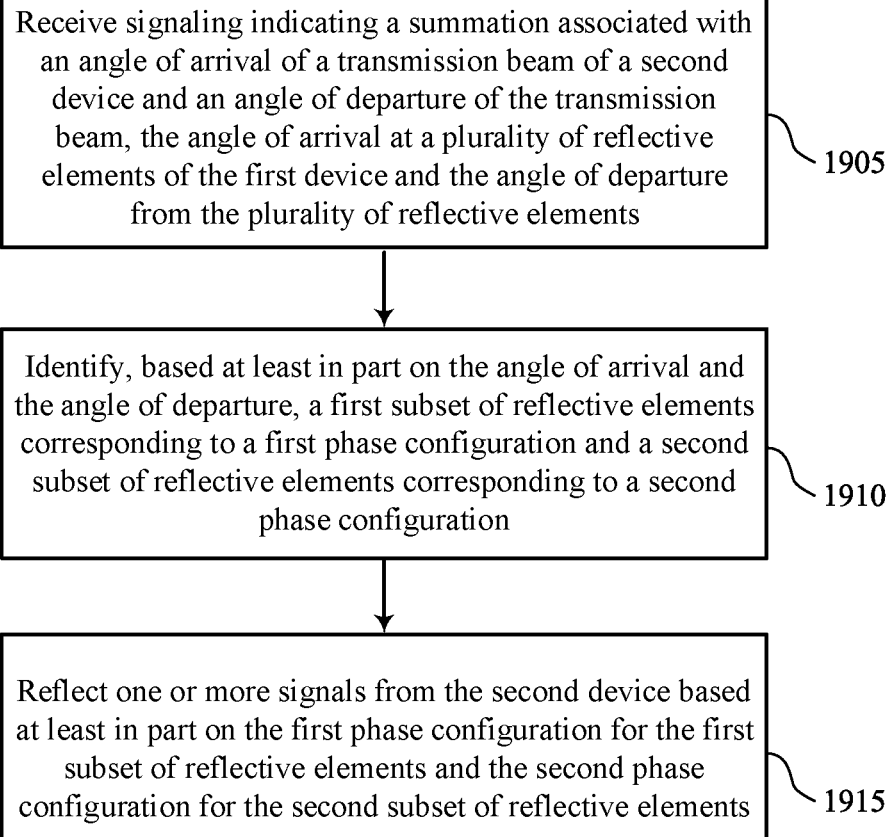

Receive signaling indicating a summation associated with an angle of arrival of a transmission beam of a second device and an angle of departure of the transmission beam, the angle of arrival at a plurality of reflective elements of the first device and the angle of departure from the plurality of reflective elements

1905

Identify, based at least in part on the angle of arrival and the angle of departure, a first subset of reflective elements corresponding to a first phase configuration and a second subset of reflective elements corresponding to a second phase configuration

1910

Reflect one or more signals from the second device based at least in part on the first phase configuration for the first subset of reflective elements and the second phase configuration for the second subset of reflective elements

Figure 20:
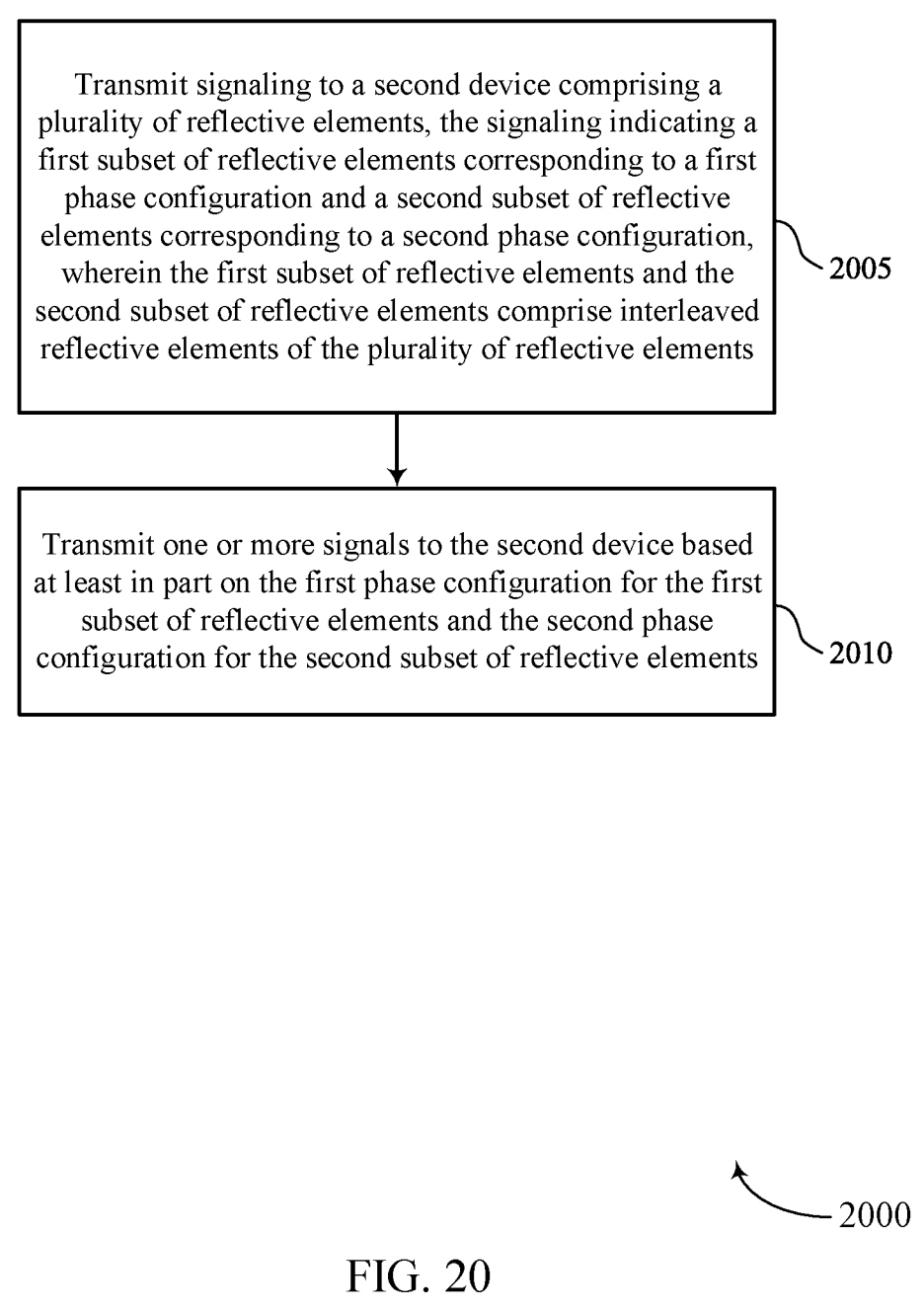

Transmit signaling to a second device comprising a plurality of reflective elements, the signaling indicating a first subset of reflective elements corresponding to a first phase configuration and a second subset of reflective elements corresponding to a second phase configuration, wherein the first subset of reflective elements and the second subset of reflective elements comprise interleaved reflective elements of the plurality of reflective elements

2005

Transmit one or more signals to the second device based at least in part on the first phase configuration for the first subset of reflective elements and the second phase configuration for the second subset of reflective elements

Transmit signaling to a second device comprising a plurality of reflective elements, the signaling indicating a ratio of a first quantity of reflective elements in a first subset corresponding to a first phase configuration and a second quantity of reflective elements in a second subset of corresponding to a second phase configuration, wherein the first subset of reflective elements and the second subset of reflective elements comprise interleaved reflective elements of the plurality of reflective elements

2105

Transmit one or more signals to the second device based at least in part on the first phase configuration for the first subset of reflective elements and the second phase configuration for the second subset of reflective elements

2110

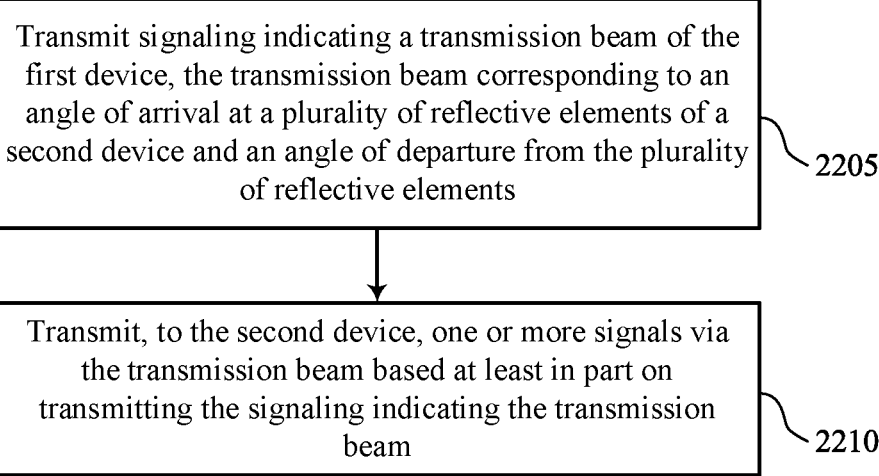

Transmit signaling indicating a transmission beam of the first device, the transmission beam corresponding to an angle of arrival at a plurality of reflective elements of a second device and an angle of departure from the plurality of reflective elements

2205

Transmit, to the second device, one or more signals via the transmission beam based at least in part on transmitting the signaling indicating the transmission beam

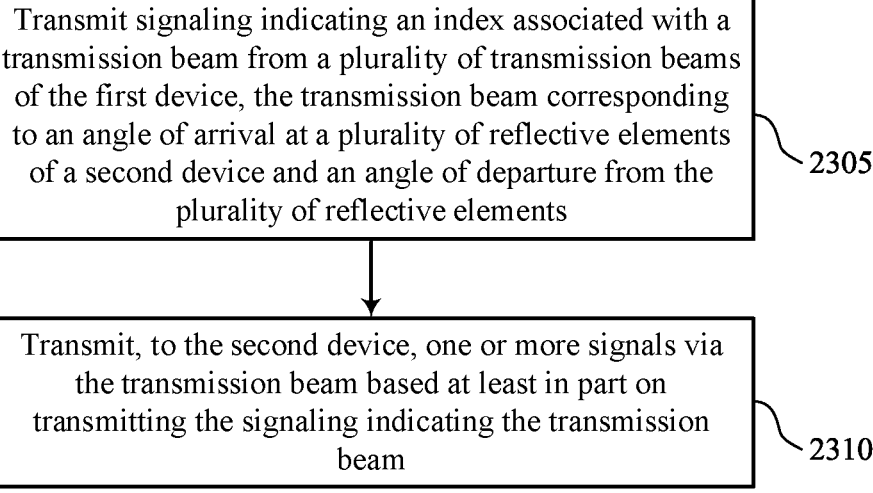

Transmit signaling indicating an index associated with a transmission beam from a plurality of transmission beams of the first device, the transmission beam corresponding to an angle of arrival at a plurality of reflective elements of a second device and an angle of departure from the plurality of reflective elements

2305

Transmit, to the second device, one or more signals via the transmission beam based at least in part on transmitting the signaling indicating the transmission beam

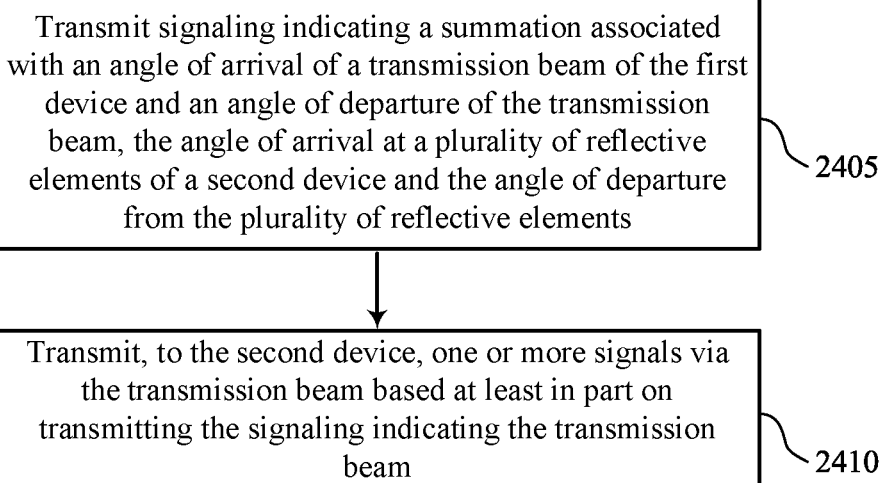

Transmit signaling indicating a summation associated with an angle of arrival of a transmission beam of the first device and an angle of departure of the transmission beam, the angle of arrival at a plurality of reflective elements of a second device and the angle of departure from the plurality of reflective elements

2405

Transmit, to the second device, one or more signals via the transmission beam based at least in part on transmitting the signaling indicating the transmission beam

RECONFIGURABLE INTELLIGENT SURFACE OPTIMIZATION AND CONTROL SIGNALING

CROSS REFERENCE

The present Application is a 371 national stage filing of International PCT Application No. PCT/CN2022/084031 by SAHRAEI et al. entitled "RECONFIGURABLE INTELLIGENT SURFACE OPTIMIZATION AND CONTROL SIGNALING," filed Mar. 30, 2022, which is assigned to the assignee hereof, and which is expressly incorporated by reference in its entirety herein.

FIELD OF TECHNOLOGY

The following relates to wireless communications, including reconfigurable intelligent surface (RIS) optimization and control signaling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support reconfigurable intelligent surface (RIS) optimization and control signaling. For example, the described techniques provide for a first device associated with an RIS to identify a phase configuration for each reflective element of the RIS based on signaling received from a second device. Specifically, the first device may include an RIS corresponding to a set of reflective elements that may each be configured according to one of two possible phase configurations. Additionally, the first device may identify a first subset of the reflective elements corresponding to a first phase configuration (e.g., from the two possible phase configurations) and a second subset of the reflective elements corresponding to a second phase configuration (e.g., from the two possible phase configurations).

In one example, the first device may identify the first and second subsets based on receiving signaling from a second device indicating the subsets. For example, the second device may transmit signaling indicating a ratio of a first quantity of reflective elements in the first subset and a second quantity of reflective elements in the second subset.

Here, the first device may identify first and second subsets that include reflective elements interleaved according to the ratio (e.g., indicated by the second device). In another example, the first device may identify the first and second subsets based on receiving signaling from the second device indicating a transmission beam of the second beam (e.g., used for signaling that is reflected by the first device from the second device to the third device). Here, the first device may identify the first and second subsets based on an angle of arrival at the first device and an angle of departure from the first device of the transmission beam. In either example, the first device may configure the first subset of reflective elements according to the first phase configuration and may configure the second subset of reflective elements according to the second phase configuration. Then, the first device may reflect transmissions between the second device and the third device.

A method for wireless communication at a first device including a set of multiple reflective elements is described. The method may include receiving signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements and reflecting one or more signals from a second device based on the first phase configuration for the first subset of reflective elements and the second phase configuration for the second subset of reflective elements.

An apparatus for wireless communication at a first device including a set of multiple reflective elements is described. The apparatus may include a processor, memory coupled with the processor, and instructions stored in the memory. The instructions may be executable by the processor to cause the apparatus to receive signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements and reflect one or more signals from a second device based on the first phase configuration for the first subset of reflective elements and the second phase configuration for the second subset of reflective elements.

Another apparatus for wireless communication at a first device including a set of multiple reflective elements is described. The apparatus may include means for receiving signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements and means for reflecting one or more signals from a second device based on the first phase configuration for the first subset of reflective elements and the second phase configuration for the second subset of reflective elements.

A non-transitory computer-readable medium storing code for wireless communication at a first device including a set of multiple reflective elements is described. The code may include instructions executable by a processor to receive signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements and reflect one or more signals from a second device based on the first phase configuration for the first subset of reflective elements and the second phase configuration for the second subset of reflective elements.

In some examples of the method, apparatuses, and non-transitory computer-readable medium described herein, receiving the signaling may include operations, features, means, or instructions for receiving the signaling indicating a ratio of a first quantity of reflective elements in the first subset and a second quantity of reflective elements in the second subset.

Some examples of the method, apparatuses, and non-transitory computer-readable medium described herein may further include operations, features, means, or instructions for receiving an indication of a set of integers corresponding to preconfigured ratio values, where receiving the signaling indicating the ratio includes receiving an indication of a first integer of the ratio from the set of integers and a second integer of the ratio from the set of integers, the first integer associated with the first subset and the second integer associated with the second subset.

In some examples of the method, apparatuses, and non-transitory computer-readable medium described herein, receiving the signaling indicating the ratio may include operations, features, means, or instructions for receiving a first integer of the ratio associated with the first subset and a second integer of the ratio associated with the second subset.

In some examples of the method, apparatuses, and non-transitory computer-readable medium described herein, receiving the signaling indicating the ratio may include operations, features, means, or instructions for receiving a first integer of the ratio associated with the first subset and a second integer indicating a difference between the first integer and a third integer of the ratio associated with the second subset.

In some examples of the method, apparatuses, and non-transitory computer-readable medium described herein, the ratio includes a first quantity of reflective elements from the first subset of reflective elements and a second quantity of reflective elements from the second subset of reflective elements and the interleaved reflective elements include the first quantity of reflective elements having the first phase configuration interleaved with the second quantity of reflective elements having the second phase configuration.

Some examples of the method, apparatuses, and non-transitory computer-readable medium described herein may further include operations, features, means, or instructions for transmitting signaling indicating a capability of the first device, where receiving the signaling indicating the first subset and the second subset may be based on the signaling indicating the capability of the first device.

In some examples of the method, apparatuses, and non-transitory computer-readable medium described herein, transmitting the signaling indicating the capability of the first device may include operations, features, means, or instructions for transmitting signaling indicating that each of the set of multiple reflective elements may have the first phase configuration or the second phase configuration, or a quantity of the set of multiple reflective elements, or both.

Some examples of the method, apparatuses, and non-transitory computer-readable medium described herein may further include operations, features, means, or instructions for reflecting a first signal to the second device based on the first phase configuration for a third subset of reflective elements and the second phase configuration for a fourth subset of reflective elements and reflecting a second signal to the second device based on the first phase configuration for a fifth subset of reflective elements different than the third subset and the second phase configuration for a sixth subset of reflective elements different than the fourth subset, where receiving the signaling may be based on reflecting the first signal and the second signal.

In some examples of the method, apparatuses, and non-transitory computer-readable medium described herein, the first signal and the second signal include sounding reference signals (SRSs), physical random access channel (PRACH) signals, or a combination thereof.

In some examples of the method, apparatuses, and non-transitory computer-readable medium described herein, the first device includes an RIS.

A method for wireless communication at a first device is described. The method may include receiving signaling indicating a transmission beam of a second device, the transmission beam corresponding to an angle of arrival at a set of multiple reflective elements of the first device and an angle of departure from the set of multiple reflective elements, identifying, based on the angle of arrival and the angle of departure, a first subset of reflective elements corresponding to a first phase configuration and a second subset of reflective elements corresponding to a second phase configuration, and reflecting one or more signals from the second device based on the first phase configuration for the first subset of reflective elements and the second phase configuration for the second subset of reflective elements.

An apparatus for wireless communication at a first device is described. The apparatus may include a processor, memory coupled with the processor, and instructions stored in the memory. The instructions may be executable by the processor to cause the apparatus to receive signaling indicating a transmission beam of a second device, the transmission beam corresponding to an angle of arrival at a set of multiple reflective elements of the first device and an angle of departure from the set of multiple reflective elements, identify, based on the angle of arrival and the angle of departure, a first subset of reflective elements corresponding to a first phase configuration and a second subset of reflective elements corresponding to a second phase configuration, and reflect one or more signals from the second device based on the first phase configuration for the first subset of reflective elements and the second phase configuration for the second subset of reflective elements.

Another apparatus for wireless communication at a first device is described. The apparatus may include means for receiving signaling indicating a transmission beam of a second device, the transmission beam corresponding to an angle of arrival at a set of multiple reflective elements of the first device and an angle of departure from the set of multiple reflective elements, means for identifying, based on the angle of arrival and the angle of departure, a first subset of reflective elements corresponding to a first phase configuration and a second subset of reflective elements corresponding to a second phase configuration, and means for reflecting one or more signals from the second device based on the first phase configuration for the first subset of reflective elements and the second phase configuration for the second subset of reflective elements.

A non-transitory computer-readable medium storing code for wireless communication at a first device is described. The code may include instructions executable by a processor to receive signaling indicating a transmission beam of a second device, the transmission beam corresponding to an angle of arrival at a set of multiple reflective elements of the first device and an angle of departure from the set of multiple reflective elements, identify, based on the angle of arrival and the angle of departure, a first subset of reflective elements corresponding to a first phase configuration and a second subset of reflective elements corresponding to a second phase configuration, and reflect one or more signals from the second device based on the first phase configuration for the first subset of reflective elements and the second phase configuration for the second subset of reflective elements.

In some examples of the method, apparatuses, and non-transitory computer-readable medium described herein, receiving the signaling indicating the transmission beam may include operations, features, means, or instructions for receiving signaling indicating an index associated with the transmission beam of the second device from a set of multiple transmission beams of the second device.

In some examples of the method, apparatuses, and non-transitory computer-readable medium described herein, receiving the signaling indicating the transmission beam may include operations, features, means, or instructions for receiving signaling indicating a summation associated with the angle of arrival and the angle of departure of the transmission beam.

In some examples of the method, apparatuses, and non-transitory computer-readable medium described herein, the transmission beam corresponds to a horizontal angle of arrival at the set of multiple reflective elements, a vertical angle of arrival at the set of multiple reflective elements, a horizontal angle of departure from the set of multiple reflective elements, and a vertical angle of departure from the set of multiple reflective elements and receiving the signaling indicating the transmission beam includes receiving a first summation associated with the horizontal angle of arrival, the vertical angle of arrival, the horizontal angle of departure, and the vertical angle of departure and a second summation associated with the vertical angle of arrival and the vertical angle of departure.

Some examples of the method, apparatuses, and non-transitory computer-readable medium described herein may further include operations, features, means, or instructions for transmitting signaling indicating a capability of the first device, where receiving the signaling indicating the transmission beam of the second device may be based on transmitting the signaling indicating the capability of the first device.

In some examples of the method, apparatuses, and non-transitory computer-readable medium described herein, transmitting the signaling indicating the capability of the first device may include operations, features, means, or instructions for transmitting signaling indicating that each of the set of multiple reflective elements may have the first phase configuration or the second phase configuration, signaling indicating a quantity of the set of multiple reflective elements, or both.

Some examples of the method, apparatuses, and non-transitory computer-readable medium described herein may further include operations, features, means, or instructions for reflecting a first signal to the second device based on the first phase configuration for a third subset of reflective elements and the second phase configuration for a fourth subset of reflective elements and reflecting a second signal to the second device based on the first phase configuration for a fifth subset of reflective elements different than the third subset and the second phase configuration for a sixth subset of reflective elements different than the fourth subset, where receiving the signaling indicating the transmission beam of the second device may be based on reflecting the first signal and the second signal.

In some examples of the method, apparatuses, and non-transitory computer-readable medium described herein, the first signal and the second signal include SRSs, PRACH signals, or a combination thereof.

In some examples of the method, apparatuses, and non-transitory computer-readable medium described herein, the first device includes an RIS.

A method for wireless communication at a first device is described. The method may include transmitting signaling to a second device including a set of multiple reflective elements, the signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements and transmitting one or more signals to the second device based on the first phase configuration for the first subset of reflective elements and the second phase configuration for the second subset of reflective elements.

An apparatus for wireless communication at a first device is described. The apparatus may include a processor, memory coupled with the processor, and instructions stored in the memory. The instructions may be executable by the processor to cause the apparatus to transmit signaling to a second device including a set of multiple reflective elements, the signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements and transmit one or more signals to the second device based on the first phase configuration for the first subset of reflective elements and the second phase configuration for the second subset of reflective elements.

Another apparatus for wireless communication at a first device is described. The apparatus may include means for transmitting signaling to a second device including a set of multiple reflective elements, the signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements and means for transmitting one or more signals to the second device based on the first phase configuration for the first subset of reflective elements and the second phase configuration for the second subset of reflective elements.

A non-transitory computer-readable medium storing code for wireless communication at a first device is described. The code may include instructions executable by a processor to transmit signaling to a second device including a set of multiple reflective elements, the signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements and transmit one or more signals to the second device based on the first phase configuration for the first subset of reflective elements and the second phase configuration for the second subset of reflective elements.

In some examples of the method, apparatuses, and non-transitory computer-readable medium described herein, transmitting the signaling may include operations, features, means, or instructions for transmitting the signaling indicating a ratio of a first quantity of reflective elements in the first subset and a second quantity of reflective elements in the second subset.

Some examples of the method, apparatuses, and non-transitory computer-readable medium described herein may further include operations, features, means, or instructions for transmitting a set of integers corresponding to preconfigured ratio values, where transmitting the signaling indicating the ratio includes transmitting an indication of a first integer of the ratio from the set of integers and a second integer of the ratio from the set of integers, the first integer associated with the first subset and the second integer associated with the second subset.

In some examples of the method, apparatuses, and non-transitory computer-readable medium described herein, transmitting the signaling indicating the ratio may include operations, features, means, or instructions for transmitting a first integer of the ratio associated with the first subset and a second integer of the ratio associated with the second subset.

In some examples of the method, apparatuses, and non-transitory computer-readable medium described herein, transmitting the signaling indicating the ratio may include operations, features, means, or instructions for transmitting a first integer of the ratio associated with the first subset and a second integer indicating a difference between the first integer and a third integer of the ratio associated with the second subset.

In some examples of the method, apparatuses, and non-transitory computer-readable medium described herein, the ratio includes a first quantity of reflective elements from the first subset of reflective elements and a second quantity of reflective elements from the second subset of reflective elements and the interleaved reflective elements include the first quantity of reflective elements having the first phase configuration interleaved with the second quantity of reflective elements having the second phase configuration.

Some examples of the method, apparatuses, and non-transitory computer-readable medium described herein may further include operations, features, means, or instructions for receiving signaling indicating a capability of the second device, where transmitting the signaling indicating the first subset and the second subset may be based on receiving the signaling indicating the capability of the first device.

In some examples of the method, apparatuses, and non-transitory computer-readable medium described herein, receiving the signaling indicating the capability of the first device may include operations, features, means, or instructions for receiving signaling indicating that each of the set of multiple reflective elements may have the first phase configuration or the second phase configuration, signaling indicating a quantity of the set of multiple reflective elements, or both.

Some examples of the method, apparatuses, and non-transitory computer-readable medium described herein may further include operations, features, means, or instructions for receiving a first signal reflected by the second device based on the first phase configuration for a third subset of reflective elements and the second phase configuration for a fourth subset of reflective elements and receiving a second signal reflected by the second device based on the first phase configuration for a fifth subset of reflective elements different than the third subset and the second phase configuration for a sixth subset of reflective elements different than the fourth subset, where transmitting the signaling may be based on reflecting the first signal and the second signal.

In some examples of the method, apparatuses, and non-transitory computer-readable medium described herein, the first signal and the second signal include SRSs, PRACH signals, or a combination thereof.

In some examples of the method, apparatuses, and non-transitory computer-readable medium described herein, the second device includes an RIS.

A method for wireless communication at a first device is described. The method may include transmitting signaling indicating a transmission beam of the first device, the transmission beam corresponding to an angle of arrival at a set of multiple reflective elements of a second device and an angle of departure from the set of multiple reflective elements and transmitting, to the second device, one or more signals via the transmission beam based on transmitting the signaling indicating the transmission beam.

An apparatus for wireless communication at a first device is described. The apparatus may include a processor, memory coupled with the processor, and instructions stored in the memory. The instructions may be executable by the processor to cause the apparatus to transmit signaling indicating a transmission beam of the first device, the transmission beam corresponding to an angle of arrival at a set of multiple reflective elements of a second device and an angle of departure from the set of multiple reflective elements and transmit, to the second device, one or more signals via the transmission beam based on transmitting the signaling indicating the transmission beam.

Another apparatus for wireless communication at a first device is described. The apparatus may include means for transmitting signaling indicating a transmission beam of the first device, the transmission beam corresponding to an angle of arrival at a set of multiple reflective elements of a second device and an angle of departure from the set of multiple reflective elements and means for transmitting, to the second device, one or more signals via the transmission beam based on transmitting the signaling indicating the transmission beam.

A non-transitory computer-readable medium storing code for wireless communication at a first device is described. The code may include instructions executable by a processor to transmit signaling indicating a transmission beam of the first device, the transmission beam corresponding to an angle of arrival at a set of multiple reflective elements of a second device and an angle of departure from the set of multiple reflective elements and transmit, to the second device, one or more signals via the transmission beam based on transmitting the signaling indicating the transmission beam.

In some examples of the method, apparatuses, and non-transitory computer-readable medium described herein, transmitting the signaling indicating the transmission beam may include operations, features, means, or instructions for transmitting signaling indicating an index associated with the transmission beam of the first device from a set of multiple transmission beams of the first device.

In some examples of the method, apparatuses, and non-transitory computer-readable medium described herein, transmitting the signaling indicating the transmission beam may include operations, features, means, or instructions for transmitting signaling indicating a summation associated with the angle of arrival and the angle of departure of the transmission beam.

In some examples of the method, apparatuses, and non-transitory computer-readable medium described herein, the transmission beam corresponds to a horizontal angle of arrival at the set of multiple reflective elements, a vertical angle of arrival at the set of multiple reflective elements, a horizontal angle of departure from the set of multiple reflective elements, and a vertical angle of departure from the set of multiple reflective elements and transmitting the signaling indicating the transmission beam includes transmitting a first summation associated with the horizontal angle of arrival, the vertical angle of arrival, the horizontal angle of departure, and the vertical angle of departure and a second summation associated with the vertical angle of arrival and the vertical angle of departure.

Some examples of the method, apparatuses, and non-transitory computer-readable medium described herein may further include operations, features, means, or instructions for receiving signaling indicating a capability of the second device, where transmitting the signaling indicating the transmission beam of the first device may be based on receiving the signaling indicating the capability of the second device.

In some examples of the method, apparatuses, and non-transitory computer-readable medium described herein, receiving the signaling indicating the capability of the second device may include operations, features, means, or instructions for receiving signaling indicating that each of the set of multiple reflective elements may have a first phase configuration or a second phase configuration, signaling indicating a quantity of the set of multiple reflective elements, or both.

Some examples of the method, apparatuses, and non-transitory computer-readable medium described herein may further include operations, features, means, or instructions for receiving a first signal reflected by the second device based on a first phase configuration for a first subset of reflective elements and a second phase configuration for a second subset of reflective elements, where the first subset of reflective elements and the second subset of reflective elements include interleaved reflective elements of the set of multiple reflective elements of the second device and receiving a second signal reflected by the second device based on the first phase configuration for a third subset of reflective elements different than the first subset and the second phase configuration for a fourth subset of reflective elements different than the second subset, where transmitting the signaling indicating the transmission beam of the first device may be based on receiving the first signal and the second signal.

In some examples of the method, apparatuses, and non-transitory computer-readable medium described herein, the first signal and the second signal include SRSs, PRACH signals, or a combination thereof.

In some examples of the method, apparatuses, and non-transitory computer-readable medium described herein, the second device includes an RIS.

BRIEF DESCRIPTION OF THE DRAWINGS

FIGS. 14 through 24 show flowcharts illustrating methods that support RIS optimization and control signaling in accordance with one or more aspects of the present disclosure.

DETAILED DESCRIPTION

Figure 1:
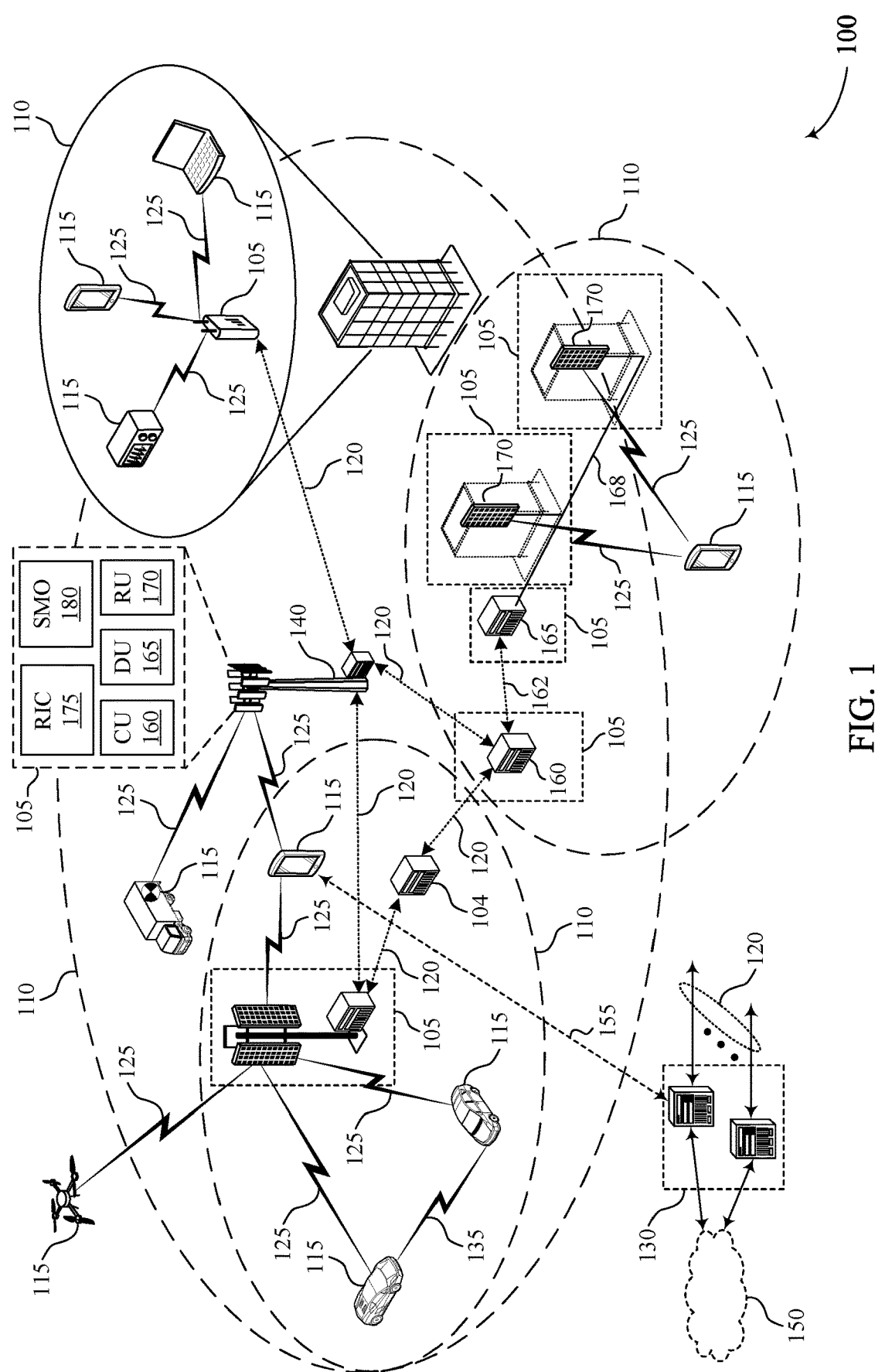
FIGS. 1 and 2 illustrate examples of wireless communications system that support reconfigurable intelligent surface (RIS) optimization and control signaling in accordance with one or more aspects of the present disclosure.

Some wireless communications systems may include a reconfigurable intelligent surface (RIS) (or a wireless device including an RIS) that reflects signaling between two other devices (e.g., between a network entity and a user equipment (UE), between two UEs). In some cases, an RIS may extend a coverage area of a device may reflecting signaling around blockages so that two devices may communicate even in cases of blockages. An RIS may include a set of reflective elements that may each be configured according to a phase configuration such that the RIS reflects signals to or from a certain direction. In some cases, a device (e.g., a network entity, a UE) may transmit signaling to the RIS indicating a phase configuration for each of the set of reflective elements of the RIS. For example, in a case that the RIS may configure each reflective element according to one of two possible phase configurations, the device may transmit signaling indicating one of the two possible phase configurations for each reflective element at the RIS.

In some cases, an RIS may include a relatively large quantity of reflective elements (e.g., four thousand reflective elements, eight thousand reflective elements). Here, signaling overhead associated with indicating the phase configuration for each of the reflective elements may be relatively large. Accordingly, the techniques described herein enable an RIS to configure each reflective element to reflect signals to or from a certain direction with relatively decreased signaling overhead (e.g., as compared to an RIS that receives signaling indicating a phase configuration for each of the set of reflective elements at the RIS).

In one example, the RIS may receive signaling indicating a first subset of the reflective elements associated with a first phase configuration (e.g., from the two possible phase configurations) and a second subset of the reflective elements associated with a second phase configuration. For example, the device may transmit signaling indicating a ratio of a first quantity of reflective elements in the first subset and a second quantity of reflective elements in the second subset. Here, the RIS may identify first and second subsets that include reflective elements interleaved according to the ratio (e.g., indicated by the second device). In another example, the RIS may receive signaling indicating a transmission beam of a device (e.g., to be reflected by the RIS to a second device). Here, the RIS may identify a first subset of the reflective elements associated with a first phase configuration (e.g., from the two possible phase configurations) and a second subset of the reflective elements associated with a second phase configuration based on an angle of arrival at the RIS and an angle of departure from the RIS associated with the indicated transmission beam. That is, the RIS may identify, based on the angle of arrival and the angle of departure, whether to configure each reflective element according to the first phase configuration or the second phase configuration. In either example, based on signaling received from another device, the RIS may configure the first subset of reflective elements according to the first phase configuration and the second subset of reflective elements according to the second phase configuration.

Aspects of the disclosure are initially described in the context of wireless communications systems. Aspects of the disclosure are then described in the context of reflective element configurations and process flows. Aspects of the disclosure are further illustrated by and described with reference to apparatus diagrams, system diagrams, and flowcharts that relate to RIS optimization and control signaling.

FIG. 1 illustrates an example of a wireless communications system 100 that supports RIS optimization and control signaling in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support RIS optimization and control signaling as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

The time intervals for the network entities 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

In some examples, the wireless communications system 100 may include one or more RISs to extend wireless communications coverage, for example around or because of blockages between devices (e.g., between a network entity 105 and a UE 115, between two UEs 115). An RIS (which may sometimes be referred to as a smart surface, a passive access point, or other similar terminology) may extend a coverage of a device by reflecting beams around blockages so that the device may communicate in the presence of blockages. In some cases, the RIS may consume relatively low power to reflect transmissions (e.g., when compared to a device transmitting beamformed signals using an active antenna unit). That is, the RIS may passively reflect beams according to a configured direction. A network entity 105 or a UE 115 may configure the RIS to reflect transmissions according to the configured direction. The RIS may include a set of reflective elements (e.g., N reflective elements) that may each be configured according to a phase configuration such that the RIS reflects signals to or from the configured direction. For example, the RIS may include a control unit that may receive signaling from a device (e.g., from a network entity 105, from a UE 115) and set the phase configuration of each reflective element.

In some cases, the device may configure the N reflective elements of the RIS in order to improve a channel $h_{eff}$ between the device and another device. For example, a network entity 105 may configure the N reflective elements of the RIS in order to improve a channel between the network entity 105 and a UE 115. In some cases, the channel $h_{eff}$ between the network entity 105 and the UE 115 via an RIS with N reflective elements may be represented according to Equation 1.

$$h_{eff} = PL_1 \cdot PL_2 \cdot \left[ 1, \, e^{j\frac{2\pi}{\lambda}d \cdot sin(\theta_{AoD})}, \, \dots \, , e^{j\frac{2\pi}{\lambda}(N-1)d \cdot sin(\theta_{AoD})} \right] \tag{1}$$
$$R\left[ 1, \, e^{j\frac{2\pi}{\lambda}d \cdot sin(\theta_{AoA})}, \, \dots \, , e^{j\frac{2\pi}{\lambda}(N-1)d \cdot sin(\theta_{AoA})} \right]^T$$

In the example of Equation 1, the $PL_1$ may correspond to a pathloss between the network entity 105 and the RIS, the $PL_1$ may correspond to a pathloss between the RIS and the UE 115, d may correspond to the element spacing (e.g., of the reflective elements of the RIS), $\theta_{AoA}$ may be the azimuth of arrival from the network entity 105 to the RIS, $\theta_{AoD}$ may be the azimuth of departure from the RIS to the UE 115, and $\lambda$ may be the wavelength (e.g., of a signal being reflected between the network entity 105 and the UE 115). Additionally, R may correspond to a diagonal matrix where the ith diagonal element $r_i$ may be defined according to Equation 2.

$$r_i = e^{j \cdot \pi \cdot \alpha_i} \tag{2}$$

In some cases, $\alpha_i$ may correspond to a phase configuration of the i'th reflective element of the RIS. In some examples, the RIS may configure each of the N reflective elements according to one of two possible phase configurations. Here, $\alpha_i$ may be selected from a set of two values. For example, $\alpha_i \in \{0,1\}$ or $$\alpha_i \in \{-\frac{1}{2}, \frac{1}{2}\}.$$

In cases that $\alpha_i$ is selected from the set of two values, the channel $h_{eff}$ between the network entity 105 and the UE 115 via an RIS with N reflective elements may additionally be represented according to Equation 3. In the example of Equation 3, d (e.g., the distance between the reflective elements of the RIS) may be assumed to have a value of $0.5\lambda$.

$$h_{eff} = PL_1 \cdot PL_2 \cdot \sum_n e^{j \cdot \pi \cdot (n(\sin(\theta_{AoD}) + \sin(\theta_{AoA})) - \alpha_n)} \quad (3)$$

Additionally, in an example where $\beta$ is defined according to Equation 4, the channel $h_{eff}$ may also be represented according to Equation 5.

$$\beta = \sin(\theta_{AoD}) + \sin(\theta_{AoA}) \quad (4)$$

$$h_{eff} = PL_1 \cdot PL_2 \cdot \sum_n e^{j \cdot \pi \cdot (n\beta - \alpha_n)} \quad (5)$$

In some cases, a larger value associated with the channel $h_{eff}$ may correspond to a higher signal strength of communications between the network entity 105 and the UE 115. Thus, configuring the phase configurations $\alpha_i$ of the RIS to increase a value of the channel $h_{eff}$ may increase a signal strength between the network entity 105 and the UE 115). Equation 6 may correspond to phase configurations $\alpha_{opt}$ of the RIS associated with a larger value of the channel $h_{eff}$ as compared to other phase configurations $\alpha_i$.

$$a_{opt} = \mathrm{argmax}_{\alpha_0, \dots, \alpha_{N-1}} \left| \sum_n e^{j \cdot \pi \cdot (n\beta - \alpha_n)} \right| \quad (6)$$

In some cases, the phase configurations $\alpha_{opt}$ as described with reference to Equation 6 may additionally be represented according to Equation 7. That is, for each value of n, the phase configurations $\alpha_n$ associated with larger values of the channel $h_{eff}$ as compared to other phase configurations $\alpha_n$ may be illustrated according to Equation 7.

$$a_n = \mathrm{argmin}_{a \in \{A_0, A_1\}} |\mathrm{mod}(n\beta - a, 2)| \text{ for } n \in \{0, N-1\} \quad (7)$$

In some cases, a device (e.g., the network entity 105) may transmit signaling to the RIS indicating a phase configuration for each of the set of reflective elements of the RIS. For example, for each reflective element N, the device may determine a phase configuration $\alpha_n$ to increase a value of the channel $h_{eff}$ as compared to other phase configurations $\alpha_i$.

For example, in a case that the RIS includes four thousand reflective elements, the device may transmit signaling indicating the phase configuration $\alpha_n$ for each of the four thousand reflective elements. In cases that the device relies on eight bits to indicate the phase configuration $\alpha_n$ for each reflective element, the device may rely on 32 thousand bits to configure the RIS to reflect signals according to a configured direction. Even in cases that the device relies on a single bit to indicate the phase configuration for each reflective element, the device may rely on four thousand bits to configure the RIS to reflect signals according to a configured direction.

In some cases, a signaling overhead associated with indicating the phase configuration for each of the reflective elements may be large. Accordingly, devices in the wireless communications system 100 may instead rely on decreased signaling overhead to configure the RIS (e.g., as compared to an RIS that receives signaling indicating a phase configuration for each of the set of reflective elements at the RIS).

In some cases, a device may instead transmit signaling indicating a first subset of the reflective elements N associated with a first phase configuration $A_0$ and a second subset of the reflective elements N associated with a second phase configuration $A_1$. In this case, the device may rely on an approximation of Equation 7 to determine the phase configurations $\alpha_n$ associated with larger values of the channel $h_{eff}$ as compared to other phase configurations $\alpha_n$. An example approximation of the phase configurations $\alpha_n$ is illustrated in Equation 8.

$$\alpha_n = \begin{cases} A_0 & \text{if } 0 \le \mathrm{mod}(n, c_1 + c_2) < c_1 \\ A_1 & \text{if } c_1 \le \mathrm{mod}(n, c_1 + c_2) < c_1 + c_2 \end{cases} \quad (8)$$

In the example of Equation 8, the phase configurations $A_0$ and $A_1$ of each of the reflective elements N may be periodic (e.g., with a period of $c_1 + c_2$). That is, a first quantity of the N reflective elements (e.g., the first $c_1$ reflective elements) may correspond to a first phase configuration $A_0$ and a second quantity of the N reflective elements (e.g., the next $c_2$ reflective elements) may correspond to a second phase configuration $A_1$.

In some cases (e.g., to decrease a signaling overhead associated with configuring an RIS), the network entity 105 may transmit signaling to the RIS indicating the first subset of the reflective elements N associated with a first phase configuration $A_0$ and the second subset of the reflective elements N associated with a second phase configuration $A_1$ by transmitting signaling indicating $c_1$ and $c_2$. In some cases, by transmitting signaling indicating $c_1$ and $c_2$ to the RIS, the network entity 105 may indicate a ratio of a first quantity of reflective elements in the first subset and a second quantity of reflective elements in the second subset. Then the RIS may identify first and second subsets that include reflective elements interleaved according to the ratio (e.g., and associated with the period of $c_1 + c_2$).

In some instances, the approximation defined in Equation 8 may be precise in cases that $\beta$ (e.g., as defined according to 4) is further defined according to Equation 9.

$$|\sin(\theta_{AoD}) + \sin(\theta_{AoA})| = \frac{2}{c_1 + c_2} \text{ with } |c_1 - c_2| \le 1 \quad (9)$$

In some instances, the network entity 105 may indicate the phase configurations for the reflective elements N by transmitting signaling indicating the value of $\beta$ (e.g., | sin $(\theta_{AoD})$+sin $(\theta_{AoA})$|) that is associated with a transmission beam of the network entity 105. Additionally, or alternatively, the network entity 105 may transmit signaling indicating the transmission beam (e.g., corresponding with the angle of departure from the RIS $\theta_{AoD}$ and the angle of arrival at the RIS $\theta_{AoA}$). In either case, the RIS may determine the phase configurations $\alpha_n$ for each of the reflective elements N of the RIS (e.g., according to Equation 7).

In some examples, the network entity 105 indicating the transmission beam (or indicating the value of $\beta$ associated with the transmission beam) may enable the RIS to determine the phase configurations $\alpha_n$ for each of the reflective elements N of the RIS even in cases that a ratio of a quantity of reflective elements of the RIS in the first subset (e.g., corresponding to a first phase configuration) and a quantity of reflective elements of the RIS in the second subset (e.g., corresponding to a second phase configuration) does not correspond to a pair of integers. Additionally, the RIS determining the phase configurations $\alpha_n$ for each of the reflective elements N based on the indicated transmission beam (or an indicated value of $\beta$ associated with the transmission beam) may enable the RIS to reflect transmissions associated with wider angles as compared to the RIS receiving signaling from the network entity 105 indicating the subsets of the reflective elements.

In either example (e.g., when the network entity 105 transmits signaling indicating $c_1$ and $c_2$ or when the network entity 105 transmits signaling indicating a transmission beam associated with $|\sin(\theta_{AoD}) + \sin(\theta_{AoA})|$), the RIS may configure the first subset of reflective elements according to the first phase configuration and the second subset of reflective elements according to the second phase configuration. Then, the RIS may reflect signals between two devices (e.g., between a network entity 105 and a UE 115, between two UEs 115) according to the configured direction.

Additionally, while Equation 9 relates to a one-dimensional RIS with N elements in a single dimension, some RISs may include the N reflective elements in a first dimension (e.g., in azimuth) an M reflective elements in another dimension (e.g., in zenith). In this example, each $r_{k,\ell}$ element of the matrix R (e.g., as described with reference to Equation 1) may be defined according to Equation 10.

$$r_{k,\ell} = e^{-1 \cdot j \cdot \pi \cdot \alpha_{k,\ell}} \qquad (10)$$

In the example where the RISs includes reflective elements in two dimensions, a channel (e.g., a line of sight channel) between the network entity 105 and the RIS may correspond to $e^{j \cdot \pi \cdot (k \cdot \sin(\theta_{ZoA}) \cdot \sin(\theta_{AoA}) + \ell \cdot \cos(\phi_{ZoA}))}$ and a channel (e.g., a line of sight channel) between the RIS and the UE may correspond to $e^{j \cdot \pi \cdot (k \cdot \sin(\phi_{ZoD}) \cdot \sin(\theta_{AoD}) + \ell \cdot \cos(\phi_{ZoD}))}$, where $\phi_{ZoA}$ may be a zenith of arrival from the network entity 105 to the RIS, $\phi_{ZoD}$ may be the zenith of departure from the RIS to the UE 115, and $\lambda$ may be the wavelength (e.g., of the signal being reflected between the network entity 105 and the UE 115).

Here, the phase configurations $\alpha_{k,\ell}$ associated with relatively larger values of the channel $h_{\textit{eff}}$ as compared to other phase configurations $\alpha_{k,\ell}$, may be illustrated according to Equation 11.

$$\alpha_{k,\ell} = \mathrm{argmin}_{a \in \{A_0, A_1\}} |\mathrm{mod}(k \cdot \beta_1 + \ell \cdot \beta_2 - a, 2)| \text{ for } k \in \{0, \ldots, N-1\} \qquad (11)$$

$$\text{and } \ell \in \{0, \ldots, M-1\}$$

In the example of Equation 11, $\beta_1$ and $\beta_2$ may be defined according to Equations 12 and 13, respectively.

$$\beta_1 = \sin(\phi_{ZoA})\sin(\theta_{AoA}) + \sin(\phi_{ZoD})\sin(\theta_{AoD}) \qquad (12)$$

$$\beta_2 = \cos(\phi_{ZoA}) + \cos(\phi_{ZoD}) \qquad (13)$$

Here, the network entity 105 may indicate the phase configurations for the reflective elements N and M by transmitting signaling indicating the values of $\beta_1$ and $\beta_2$ that are associated with a transmission beam of the network entity 105. Additionally, or alternatively, the network entity 105 may transmit signaling indicating the transmission beam (e.g., corresponding with the zenith angle of arrival at the RIS $\phi_{ZoA}$, the azimuth angle of arrival at the RIS $\theta_{AoA}$, the zenith angle of departure from the RIS $\phi_{ZoD}$, and the azimuth angle of departure from the RIS $\theta_{AoD}$). In either case, the RIS may determine the phase configurations $\alpha_{k,\ell}$ for each of the reflective elements N and M of the RIS (e.g., according to Equation 11). In some examples of an RIS that includes reflective elements in two dimensions, the RIS may reflect a beam (e.g., to a receiving device). Additionally, the RIS may reflect a second beam in another symmetric direction.

Figure 2:
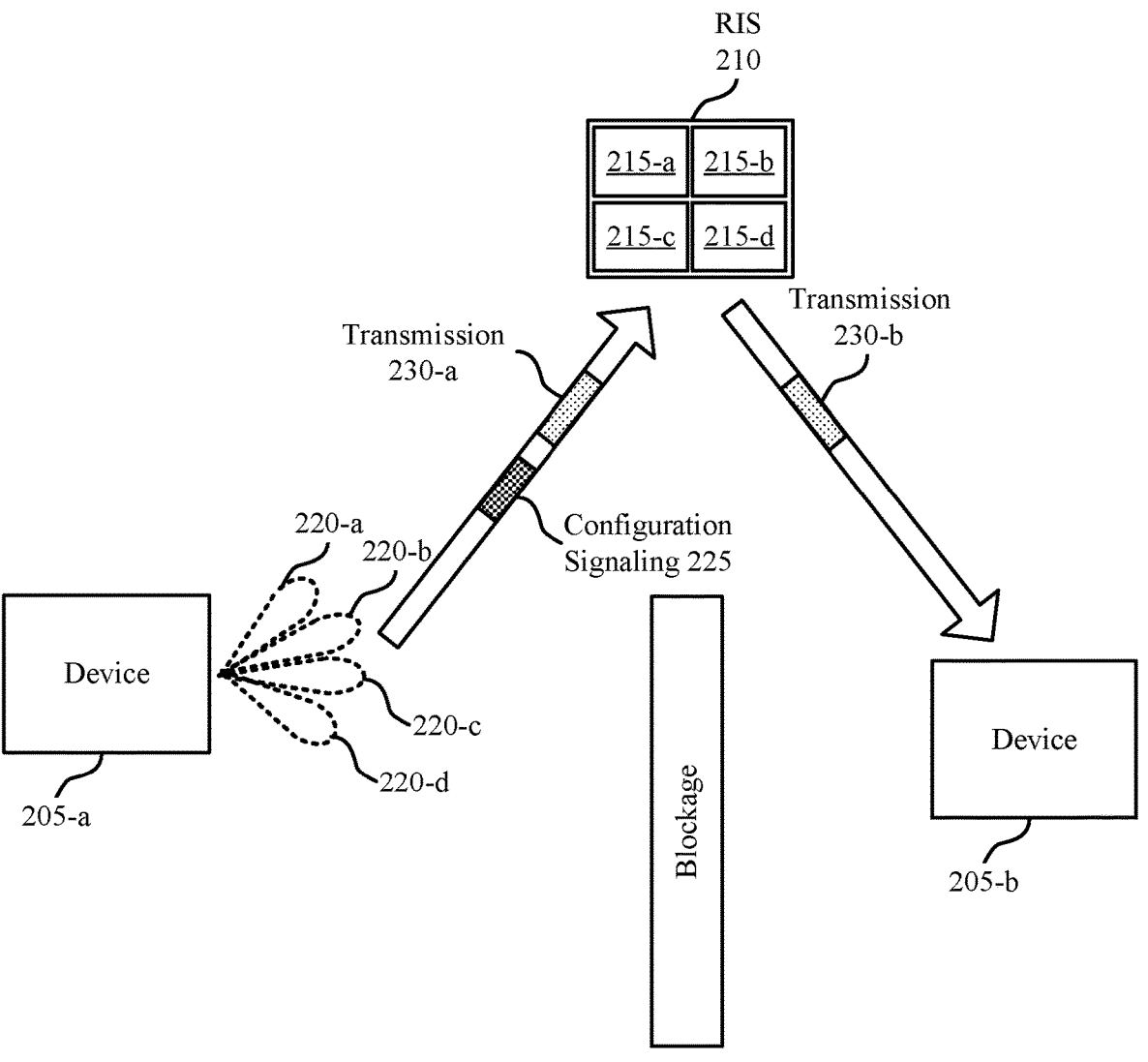

FIG. 2 illustrates an example of a wireless communications system 200 that supports RIS optimization and control signaling in accordance with one or more aspects of the present disclosure. The wireless communications system 200 may be an example of a wireless communications system 100. For example, the wireless communications system 200 may include devices 205 that may be examples of a network entity or a UE as described with reference to FIG. 1. Additionally, the wireless communications system 200 may include an RIS 210 with a set of reflective elements 215 (e.g., reflective element 215-*a*, reflective element 215-*b*, reflective element 215-*c*, reflective element 215-*d*). While the RIS 210 includes four illustrated reflective elements 215, the RIS 210 may include more than four reflective elements 215 (e.g., one thousand reflective elements 215, four thousand reflective elements 215).

Wireless communications system 200 may support MIMO techniques, which may in turn support increases in throughput (e.g., as compared to wireless communications systems that do not support MIMO techniques). In some cases, to support MIMO techniques, the devices 205 may communicate via beams 220 associated with high beamforming gains using active antenna units. This may include configuring individual radio frequency (RF) chains per antenna port. However, this approach may be associated with a significant increase in power consumption due to the use of the active antenna units. Accordingly, wireless communications system 200 may include an RIS 210, which may be employed within the wireless communications system 200 to extend coverage (e.g., around a blockage), with negligible power consumption (e.g., as compared to an active antenna unit).

The device 205-*a* may communicate with the device 205-*b* via the RIS 210. For example, the RIS 210 may reflect transmissions 230 from the device 205-*a* (e.g., transmitted via one of the beams 220) to the device 205-*b*. In some cases, the RIS 210 may reflect transmissions 230 according to a direction that is based on a phase configuration of each of the reflective elements 215 of the RIS 210. For example, the RIS 210 may set a phase configuration of each of the reflective elements to adjust an angle of departure of transmission 230-b reflected by the RIS 210.

The RIS 210 may set a phase configuration of each of the reflective elements 215 based on receiving configuration signaling 225 from the device 205-a. For example, the device 205-a may transmit configuration signaling 225 indicating a first subset of the reflective elements 215 associated with a first phase configuration and a second subset of the reflective elements 215 associated with a second phase configuration. In some cases, the configuration signaling 225 may indicate the first and second subsets of the reflective elements 215 by indicating a ratio of a first quantity of the reflective elements 215 in the first subset (e.g., by indicating a value of $c_1$ as described with reference to Equation 8) and a second quantity of the reflective elements 215 in the second subset (e.g., by indicating a value of $c_2$ as described with reference to Equation 8). The RIS may then identify the first and second subsets of the reflective elements 215 based on the first quantity of reflective elements 215 (e.g., corresponding to the value of value of $c_1$) being periodically interleaved with the second quantity of reflective elements 215 (e.g., corresponding to the value of value of $c_2$).

In another example, the device 205-a may transmit configuration signaling 225 indicating a beam 220 associated with the transmission 230-a (e.g., to be reflected by the RIS 210 to the device 205-b). In one example, the device 205-a may transmit the configuration signaling 225 indicating an index associated with one of the beams 220. In another example, the device 205-a may transmit the configuration signaling 225 indicating a beam 220 by transmitting a summation associated with an angle of arrival (e.g., at the RIS 210) associated with the beam 220 and an angle of departure (e.g., from the RIS 210) associated with the beam 220. That is, the device 205-a may transmit the configuration signaling 225 indicating the value of β associated with one of the beams 220 (e.g., | sin $(\theta_{AoD})$+sin $(\theta_{AoA})$|).

In cases that the configuration signaling 225 indicates one of the beams 220 (e.g., beam 220-a, beam 220-b, beam 220-c, or beam 220-d), the RIS 210 may identify the first and second subsets of the reflective elements 215 based on the indicated beam 220. Specifically, the RIS 210 may identify a ratio of a first quantity of the reflective elements 215 in the first subset (e.g., $c_1$) and a second quantity of the reflective elements 215 in the second subset (e.g., $c_2$) based on the indicated beam 220. For example, the RIS 210 may identify the values of $c_1$ and $c_2$ based on the value of β associated with the beam 220 indicated by the configuration signaling 225 according to Equation 9. Then, the RIS 210 may identify the first and second subsets of the reflective elements 215 based on the first quantity of reflective elements 215 (e.g., corresponding to the value of value of $c_1$) being periodically interleaved with the second quantity of reflective elements 215 (e.g., corresponding to the value of value of $c_2$), for example according to Equation 8.

Based on identifying the first and second subsets of the reflective elements 215 (e.g., in response to receiving the configuration signaling 225 from the device 205-a), the RIS 210 may configure each reflective element 215 in the first subset to the first phase configuration and each reflective element 215 in the second subset to the second phase configuration. In some cases, based on transmitting the configuration signaling 225 to the RIS 210, the device 205-a may communicate transmissions 230-a to the device 205-b via the RIS 210. For example, the device 205-a may communicate the transmission 230-a via a beam 220 and the RIS 210 may reflect the transmission 230-b to the device 205-b.

Figure 3A:
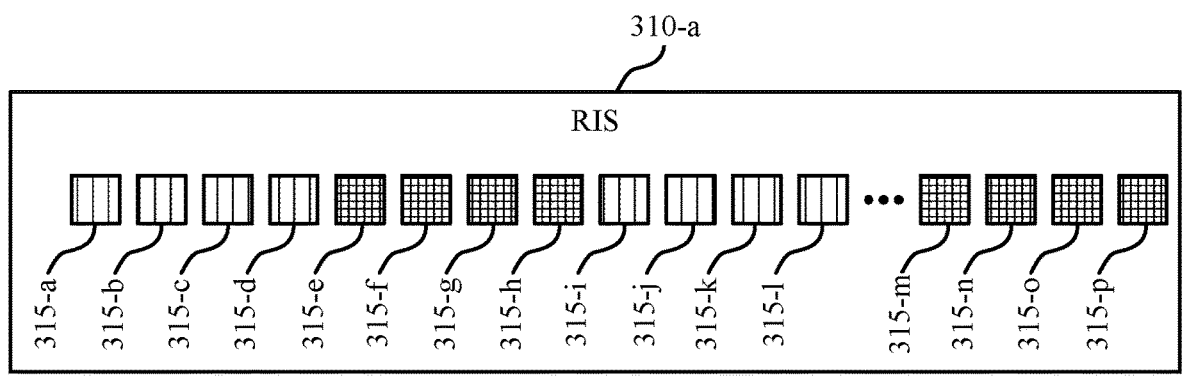
FIGS. 3A and 3B illustrate example reflective element configurations that support RIS optimization and control signaling in accordance with one or more aspects of the present disclosure.
Figure 3B:
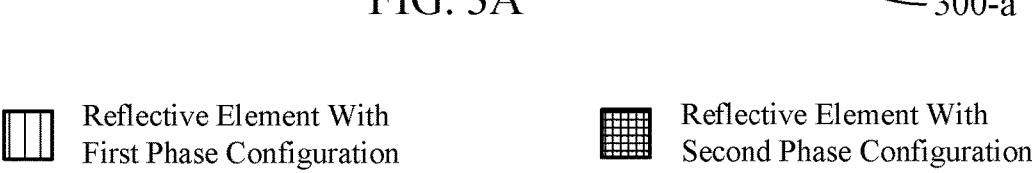

FIGS. 3A and 3B illustrate examples of reflective element configurations 300 that support RIS optimization and control signaling in accordance with one or more aspects of the present disclosure. The reflective element configurations 300 may include aspects of the wireless communications systems as described with reference to FIGS. 1 and 2. For example, the reflective element configurations 300 may be implemented by an RIS 310 including a set of reflective elements 315 (e.g., reflective elements 315-a through 315-p, reflective elements 315-q through 315-6), which may be examples of an RIS and reflective elements, respectively, as described with reference to FIGS. 1 and 2. In the reflective element configurations 300, each of the reflective elements 315 may be configured according to a phase configuration selected from a set of two values. Thus, each reflective element 315 of the RISs 310 may be configured according to a first phase configuration or a second phase configuration.

The RIS 310 may set a phase configuration of each of the reflective elements 315 based on receiving signaling from another device (e.g., from a network entity, from a UE). For example, the RIS 310 may receive signaling indicating a first subset of the reflective elements 315 corresponding to the first phase configuration and a second subset of the reflective elements 315 corresponding to the second phase configuration. The signaling may indicate the first and second subsets of the reflective elements 315 based on indicating a ratio of a first quantity of the reflective elements 315 in the first subset (e.g., by indicating a value of $c_1$ as described with reference to Equation 8) and a second quantity of the reflective elements 315 in the second subset (e.g., by indicating a value of $c_2$ as described with reference to Equation 8).

FIG. 3A illustrates an example reflective element configuration 300-a where the ratio of a first quantity of reflective elements 315 in the first subset (e.g., corresponding to the first phase configuration) and a second quantity of reflective elements 315 in the second subset (e.g., corresponding to the second phase configuration) is four to four. Specifically, the RIS 310-a may receive signaling from a network entity or a UE indicating that a value of $c_1$ (e.g., as described with reference to Equation 8) is four and that a value of $c_2$ (e.g., as described with reference to Equation 8) is four. For example, the RIS 310-a may receive signaling indicating that four reflective elements 315 from the first subset (e.g., corresponding to the first phase configuration) are interleaved with four reflective elements 315 from the second subset (e.g., corresponding to the second phase configuration).

Then, the RIS 310-a may configure each of the reflective elements 315 according to the phase configurations indicated by the ratio. In the example of the reflective element configuration 300-a, the RIS 310-a may configure a first quantity $c_1$ (e.g., four) of the reflective elements 315-a, 315-b, 315-c, and 315-d according to the first phase configuration. The RIS 310-a may additionally configure a next second quantity $c_2$ (e.g., four) of the reflective elements 315-e, 315-f, 315-g, and 315-h according to the second phase configuration. The RIS 310-a may continue interleaving the first quantity $c_1$ of reflective elements 315 configured according to the first phase configuration with the second quantity $c_2$ of reflective elements 315 configured according to the second phase configuration. Thus, the RIS 310-a may configure each of the reflective elements 315 in the first subset according to the first phase configuration and each of the reflective elements 315 in the second subset according to the second phase configuration.

FIG. 3B illustrates an example reflective element configuration 300-b where the ratio of a first quantity of reflective elements 315 in the first subset (e.g., corresponding to the first phase configuration) and a second quantity of reflective elements 315 in the second subset (e.g., corresponding to the second phase configuration) is two to one. Specifically, the RIS 310-b may receive signaling from a network entity or a UE indicating that a value of $c_1$ (e.g., as described with reference to Equation 8) is two and that a value of $c_2$ (e.g., as described with reference to Equation 8) is one. For example, the RIS 310-b may receive signaling indicating that four reflective elements 315 from the first subset (e.g., corresponding to the first phase configuration) are interleaved with four reflective elements 315 from the second subset (e.g., corresponding to the second phase configuration).

Then, the RIS 310-b may configure each of the reflective elements 315 according to the phase configurations indicated by the ratio. In the example of the reflective element configuration 300-b, the RIS 310-b may configure a first quantity $c_1$ (e.g., two) of the reflective elements 315-q and 315-r according to the first phase configuration. The RIS 310-b may additionally configure a next second quantity $c_2$ (e.g., one) of the reflective elements 315-s according to the second phase configuration. The RIS 310-b may continue interleaving the first quantity $c_1$ of reflective elements 315 configured according to the first phase configuration with the second quantity $c_2$ of reflective elements 315 configured according to the second phase configuration. Thus, the RIS 310-b may configure each of the reflective elements 315 in the first subset according to the first phase configuration and each of the reflective elements 315 in the second subset according to the second phase configuration.

Figure 3B:
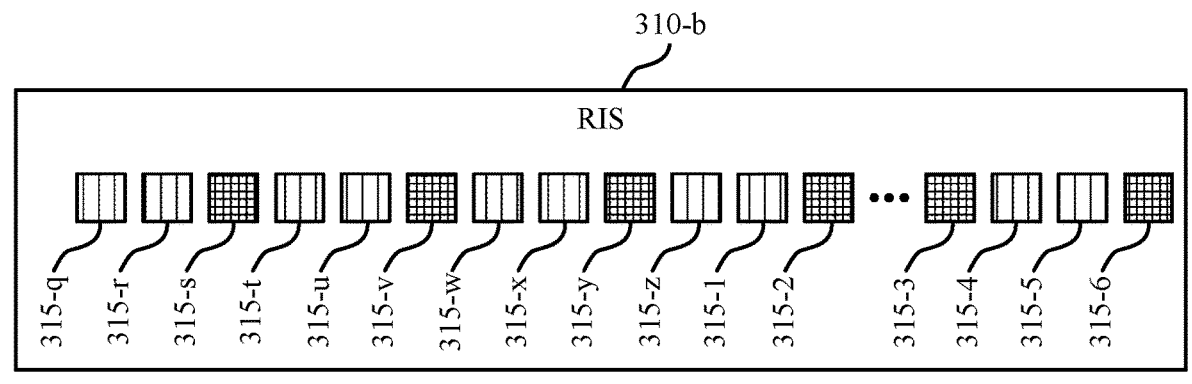
Figure 4:
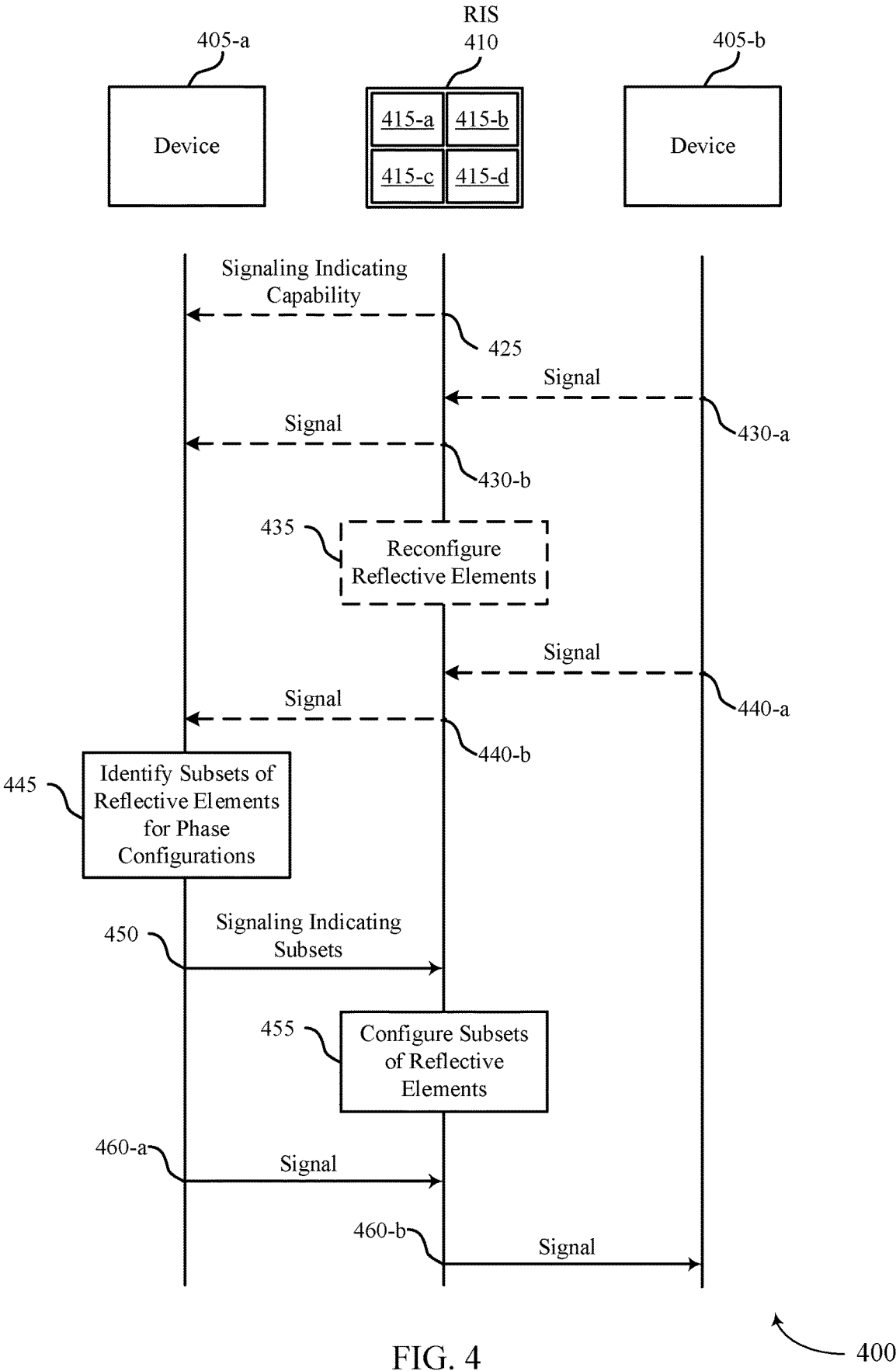
FIGS. 4 and 5 illustrate examples of process flows in a system that support RIS optimization and control signaling in accordance with one or more aspects of the present disclosure.

FIG. 4 illustrates an example of a process flow 400 in a system that supports RIS optimization and control signaling in accordance with one or more aspects of the present disclosure. The process flow 400 may implement or be implemented by one or more aspects of devices as described with reference to FIGS. 1 through 3. For example, the process flow may include one or more devices 405 (e.g., a device 405-a, a device 405-b), which may be examples of a network entity or a UE as described with reference to FIGS. 1 through 3. Additionally, the process flow 400 may be implemented by an RIS 410 including a set of reflective elements 415 (e.g., reflective element 415-a, reflective element 415-b, reflective element 415-c, reflective element 415-d). as described with reference to FIGS. 1 through 3. In the following description of the process flow 400, operations between the devices 405 and the RIS 410 may occur in a different order or at different times than as shown. Some operations may also be omitted from the process flow 400, and other operations may be added to the process flow 400.

At 425, the RIS 410 may transmit signaling to the device 405-a indicating a capability of the RIS 410. For example, the RIS 410 may transmit signaling indicating that each reflective element 415 of the RIS 410 is configured according to a phase configuration from a set of two phase configurations. That is, the RIS 410 may transmit signaling indicating that the RIS 410 is a binary phase RIS 410. Additionally, the RIS 410 may transmit signaling indicating a quantity of the reflective elements 415 at the RIS 410. Additionally, the RIS 410 may indicate a spacing between each of the reflective elements 415.

At 430-a, the device 405-b may transmit a signal to be reflected by the RIS 410. At 430-b, the RIS 410 may reflect the one or more signals (e.g., transmitted by the device 405-b at 430-a) to the device 405-a. In some cases, the signal may be a sounding reference signal (SRS), a physical random access channel (PRACH) signal, or another type of reference signal.

At 435, the RIS 410 may reconfigure the reflective elements 415 from a first configuration to a second configuration (e.g., by adjusting a phase configuration of one or more of the reflective elements 415). In some cases, the first and second configurations of the reflective elements 415 (e.g., the phase configurations associated with each of the reflective elements 415 for the first and second configurations) may be predefined. For example, the RIS 410 may receive signaling from a network entity or one of the devices 405 indicating the phase configurations for each of the reflective elements 415 associated with the first and second configurations.

At 440-a, the device 405-b may transmit a signal to be reflected by the RIS 410. At 440-b, the RIS 410 may reflect the one or more signals (e.g., transmitted by the device 405-b at 430-a) to the device 405-a. Thus, the device 405-b may transmit a signal (e.g., an SRS, a PRACH signal, another type of reference signal) two or more times to the device 405-a (e.g., via the RIS 410) and the RIS 410 may adjust a phase configuration of the set of reflective elements 415 for each of the signal transmissions.

In some cases, the device 405-a may determine a value of the $\beta$ as described with reference to Equations 4, 12, and 13 based on receiving the two or more signals at 430-b and 440-b. For example, in cases that the RIS 410 includes reflective elements 415 in a single dimension, the device 405-a may determine a value of $\beta$ corresponding to sin $(\theta_{AoD})$+sin $(\theta_{AoA})$ as described with reference to Equation 4. Additionally, in cases that the RIS includes reflective elements 415 in two dimensions (e.g., an azimuth and a zenith dimension), the device 405-a may determine values of $\beta$ corresponding to sin $(\phi_{ZoA})$ sin $(\theta_{AoA})$+sin $(\phi_{ZoD})$ sin $(\theta_{AoD})$ and cos $(\phi_{ZoA})$+cos $(\phi_{ZoD})$ as described with reference to Equations 12 and 13, respectively, associated with a beam used for communications with the device 405-b via the RIS 410.

At 445, the device 405-a may identify a first subset of the reflective elements 415 of the RIS 410 corresponding to a first phase configuration and a second subset of the reflective elements 415 of the RIS 410 corresponding to a second phase configuration. For example, the device 405-a may determine a value of the $\beta$ based on receiving the two or more signals from the device 405-b via the RIS 410 at 430-b and 440-b. Then, the device 405-a may identify a first quantity of the reflective elements 415 (e.g., a first $c_1$ reflective elements 415) corresponding to a first phase configuration A, and a second quantity of the reflective elements 415 (e.g., the next $c_2$ reflective elements 415) corresponding to a second phase configuration $A_1$. For example, the device 405-a may rely on Equation 8 to identify the periodic phase configurations $A_0$ and $A_1$ of each of the reflective elements 415 (e.g., with a period of $c_1+c_2$). In some cases, the periodic phase configurations $A_0$ and $A_1$ of each of the reflective elements 415 may correspond to a ratio of the first quantity of the reflective elements 415 (e.g., $c_1$ reflective elements 415) and the second quantity of the reflective elements 415 (e.g., $c_2$ reflective elements 415).

At 450, the device 405-a may transmit signaling indicating the first subset of reflective elements 415 corresponding to the first phase configuration and the second subset of reflective elements 415 corresponding to the second phase configuration. That is, the device 405-*a* may transmit signaling indicating the ratio of the first quantity of the reflective elements 415 in the first subset (e.g., $c_1$ reflective elements 415) and the second quantity of the reflective elements 415 in the second subset (e.g., $c_2$ reflective elements 415).

In some cases, the device 405-*a* may indicate the ratio by transmitting signaling indicating the values of $c_1$ and $c_2$. In some other cases, the device 405-*a* may indicate the ratio by transmitting signaling indicating the value of the first quantity of reflective elements 415 in the first subset (e.g., $c_1$) and a difference between the first quantity and the second quantity of reflective elements 415 in the second subset (e.g., $c_2$). For example, at 450 the device 405-*a* may transmit signaling indicating the value of $c_1$ and may transmit an additional one-bit indicating that $c_2$ is either equal to $c_1$ or that $c_2$ is one less than $c_1$.

In some other cases, the device 405-*a* may indicate the ratio from a preconfigured set of values. That is, the device 405-*a* may transmit signaling to the RIS 410 indicating a set of integers. For example, the device 405-*a* may transmit signaling indicating a set of integers $Q_i=\{1,2,4,8,16, \ldots, N\}$. Then, at 450 the device 405-*a* may transmit signaling indicating a first index corresponding to the set of integers and indicating the first quantity of reflective elements 415 from the set of integers. Additionally, the device 405-*a* may transmit signaling indicating a second index corresponding to the set of integers and indicating the second quantity of reflective elements 415 from the set of integers. In another case, the device 405-*a* may indicate the second quantity of reflective elements 415 based on indicating the difference between the first quantity and the second quantity. In an example where the set $Q_i$ includes N integers, the device 405-*a* may indicate the first and second quantities of reflective elements 415 associated with the first and second subsets, respectively, using $1+\log_2 \log_2 N$ bits. That is, the device 405-*a* may rely on $\log_2 \log_2 N$ bits to indicate one of the set of integers $Q_i$ corresponding to the first quantity of reflective elements 415. Additionally, the device 405-*a* may rely on a single bit to indicate whether the second quantity of reflective elements 415 is equal to the first quantity of reflective elements 415 or one less than the first quantity of reflective elements 415. Here, in a case that N is 4096, the device 405-*a* may rely on 5 bits to indicate the subsets of the reflective elements 415 for phase configurations at 450.

Additionally, in some other cases, the device 405-*a* may indicate the ratio from a set of preconfigured ratios. That is, the device 405-*a* may transmit a set of preconfigured ratio values to the RIS 410 (e.g., indicating that $(c_1, c_2)$ E P for some $P \subseteq [0:N-1] \times [0:N-1]$. Here, the device 405-*a* may transmit the signaling indicating the subsets at 450 by transmitting signaling indicating an index from the set of preconfigured ratio values (e.g., P). In one example, the device 405-*a* may transmit signaling indicating P={(1,1), (2,1), (2,2), (3,2), (3,3), (4,3), (4,4), (6,6), (8,8), (16,16)} (e.g., to provide a uniform coverage in a range of field of view associated with communications between the devices 405-*a* and 405-*b*). Here, the device 405-*a* may rely on 4 bits to indicate one of the preconfigured ratios in P, which may be less bits than the device 405-*a* may rely on to indicate the first and second values in the ratio from a set of preconfigured values (e.g., eight bits).

At 455, the RIS 410 may configure each of the reflective elements 415 according to the indicated subsets. For example, the RIS 410 may identify the subsets of the reflective elements 415 based on the indicated ratio. That is, the RIS 410 may identify that the first subset of the reflective elements 415 corresponding to a first phase configuration includes the first quantity of reflective elements 415 (e.g., $c_1$) interleaved with the second quantity (e.g., $c_2$) of reflective elements 415 from the second subset of reflective elements 415 corresponding to the second phase configuration. Based on identifying the subsets, the RIS 410 may configure each reflective element 415 in the first subset according to the first phase configuration. Additionally, the RIS 410 may configure each reflective element 415 in the second subset according to the second phase configuration.

In some cases, at 460-*a* the device 405-*a* may transmit a signal to the device 405-*b* via the RIS 410. Here, at 460-*b* the RIS 410 may reflect the signal from the device 405-*a* to the device 405-*b*. In some cases, a direction of the reflected signal may be based on the phase configuration of each of the reflective elements 415.

Figure 5:
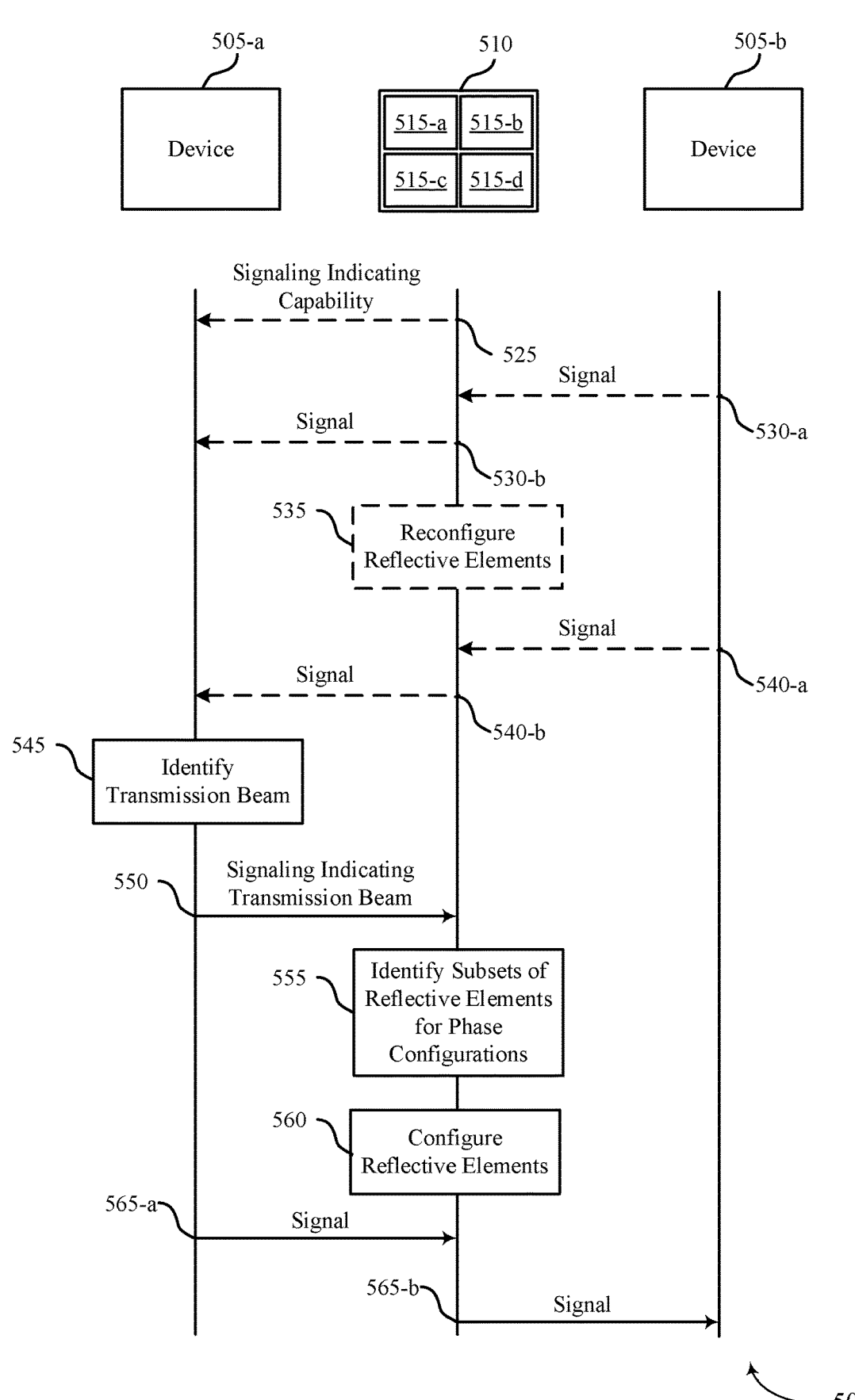

FIG. 5 illustrates an example of a process flow 500 in a system that supports RIS optimization and control signaling in accordance with one or more aspects of the present disclosure. The process flow 500 may implement or be implemented by one or more aspects of devices as described with reference to FIGS. 1 and 2. For example, the process flow may include one or more devices 505 (e.g., a device 505-*a*, a device 505-*b*), which may be examples of a network entity or a UE as described with reference to FIGS. 1 and 2. Additionally, the process flow 500 may be implemented by an RIS 510 including a set of reflective elements 515 (e.g., reflective element 515-*a*, reflective element 515-*b*, reflective element 515-*c*, reflective element 515-*d*). as described with reference to FIGS. 1 and 2. In the following description of the process flow 500, operations between the devices 505 and the RIS 510 may occur in a different order or at different times than as shown. Some operations may also be omitted from the process flow 500, and other operations may be added to the process flow 500.

At 525, the RIS 510 may transmit signaling to the device 505-*a* indicating a capability of the RIS 510. For example, the RIS 510 may transmit signaling indicating that each reflective element 515 of the RIS 510 is configured according to a phase configuration from a set of two phase configurations. That is, the RIS 510 may transmit signaling indicating that the RIS 510 is a binary phase RIS 510. Additionally, the RIS 510 may transmit signaling indicating a quantity of the reflective elements 515 at the RIS 510. Additionally, the RIS 510 may indicate a spacing between each of the reflective elements 515.

At 530-*a*, the device 505-*b* may transmit a signal to be reflected by the RIS 510. At 530-*b*, the RIS 510 may reflect the one or more signals (e.g., transmitted by the device 505-*b* at 530-*a*) to the device 505-*a*. In some cases, the signal may be an SRS, a PRACH signal, or another type of reference signal.

At 535, the RIS 510 may reconfigure the reflective elements 515 from a first configuration to a second configuration (e.g., by adjusting a phase configuration of one or more of the reflective elements 515). In some cases, the first and second configurations of the reflective elements 515 (e.g., the phase configurations associated with each of the reflective elements 515 for the first and second configurations) may be predefined. For example, the RIS 510 may receive signaling from a network entity or one of the devices 505 indicating the phase configurations for each of the reflective elements 515 associated with the first and second configurations.

At 540-*a*, the device 505-*b* may transmit a signal to be reflected by the RIS 510. At 540-*b*, the RIS 510 may reflect the one or more signals (e.g., transmitted by the device 505-b at 530-a) to the device 505-a. Thus, the device 505-b may transmit a signal (e.g., an SRS, a PRACH signal, another type of reference signal) two or more times to the device 505-a (e.g., via the RIS 510) and the RIS 510 may adjust a phase configuration of the set of reflective elements 515 for each of the signal transmissions.

In some cases, at 545, the device 505-a may determine a transmission beam associated with communications between the devices 505-a and 505-b via the RIS 510 based on receiving the two or more signals at 530-b and 540-b. Additionally, the device 505-a may determine a value of the β (e.g., associated with the transmission beam) as described with reference to Equations 5, 12, and 13. For example, in cases that the RIS 510 includes reflective elements 515 in a single dimension, the device 505-a may determine a value of β corresponding to sin $(\theta_{AoD})$+sin $(\theta_{AoA})$ as described with reference to Equation 5. Additionally, in cases that the RIS includes reflective elements 515 in two dimensions (e.g., an azimuth and a zenith dimension), the device 505-a may determine values of β corresponding to sin $(\phi_{ZoA})$ sin $(\theta_{AoA})$+sin $(\phi_{ZoD})$ sin $(\theta_{AoD})$ and cos $(\phi_{ZoA})$+cos $(\phi_{ZoD})$ as described with reference to Equations 12 and 13, respectively, associated with a beam used for communications with the device 505-b via the RIS 510.

At 550, the device 505-a may transmit signaling to the RIS 510 indicating the transmission beam associated with communications between the devices 505-a and 505-b. For example, the device 505-a may transmit signaling indicating an index corresponding to one of the transmit beams of the set of transmit beams associated with the device 505-a. In an example that the device 505-a is associated with M transmission beams, the device 505-a may transmit signaling indicating the index associated with one of the M transmission beams using $\log_2 M$ bits. In another example, the device 505-a may transmit signaling indicating the value of β corresponding to the transmission beam associated with communications between the devices 505-a and 505-b. Additionally, or alternatively, the At 555, the RIS 510 may identify the subsets of the reflective elements 515 based on receiving the signaling indicating the transmission beam of the device 505-a. For example, in cases that the signaling indicating the transmission beam indicates an index associated with a transmission beam, the RIS 510 may determine a value of β corresponding to the indicated transmission beam. Then, in cases that the RIS 510 includes reflective elements 515 on a single dimension, the RIS 510 may determine the phase configurations $\alpha_n$ for each of the reflective elements N of the RIS (e.g., according to Equation 7). Additionally, in cases that the RIS 510 includes reflective elements 515 on two dimensions, the RIS 510 may determine the phase configurations $\alpha_{k,l}$ for each of the reflective elements N and M of the RIS 510 (e.g., according to Equation 11). The RIS 510 may identify the first subset as including each of the reflective elements 515 associated with a first phase configuration $A_0$. Additionally, the RIS 510 may identify the second subset as including each of the reflective elements associated with a second phase configuration $A_1$.

At 560, the RIS 510 may configure each of the reflective elements 515 according to the indicated subsets. That is, the RIS 510 may configure each reflective element 515 in the first subset according to the first phase configuration. Additionally, the RIS 510 may configure each reflective element 515 in the second subset according to the second phase configuration.

In some cases, at 565-a, the device 505-a may transmit a signal to the device 505-b via the RIS 510. Additionally, at 565-b the RIS 510 may reflect the signal from the device 505-a to the device 505-b. In some cases, a direction of the reflected signal may be based on the phase configuration of each of the reflective elements 515.

Figure 6:
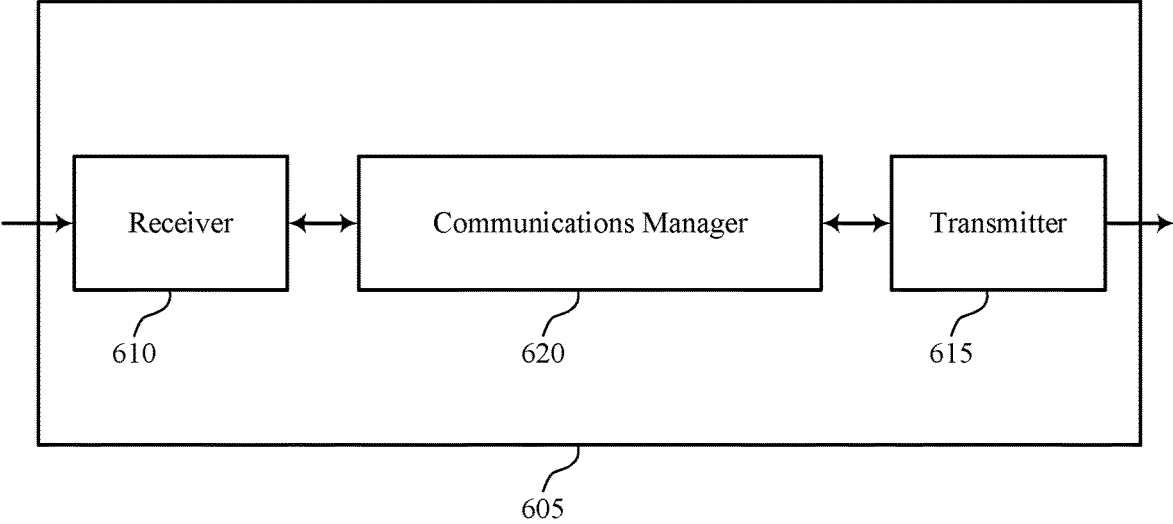
FIGS. 6 and 7 show block diagrams of devices that support RIS optimization and control signaling in accordance with one or more aspects of the present disclosure.

FIG. 6 shows a block diagram 600 of a device 605 that supports RIS optimization and control signaling in accordance with one or more aspects of the present disclosure. The device 605 may be an example of aspects of a wireless device as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to RIS optimization and control signaling). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to RIS optimization and control signaling). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of RIS optimization and control signaling as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first device including a set of multiple reflective elements in accordance with examples as disclosed herein. For example, the communications manager 620 may be configured as or otherwise support a means for receiving signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements. The communications manager 620 may be configured as or otherwise support a means for reflecting one or more signals from a second device based on the first phase configuration for the first subset of reflective elements and the second phase configuration for the second subset of reflective elements.

Additionally, or alternatively, the communications manager 620 may support wireless communication at a first device in accordance with examples as disclosed herein. For example, the communications manager 620 may be configured as or otherwise support a means for receiving signaling indicating a transmission beam of a second device, the transmission beam corresponding to an angle of arrival at a set of multiple reflective elements of the first device and an angle of departure from the set of multiple reflective elements. The communications manager 620 may be configured as or otherwise support a means for identifying, based on the angle of arrival and the angle of departure, a first subset of reflective elements corresponding to a first phase configuration and a second subset of reflective elements corresponding to a second phase configuration. The communications manager 620 may be configured as or otherwise support a means for reflecting one or more signals from the second device based on the first phase configuration for the first subset of reflective elements and the second phase configuration for the second subset of reflective elements.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for more efficient utilization of communication resources.

Figure 7:
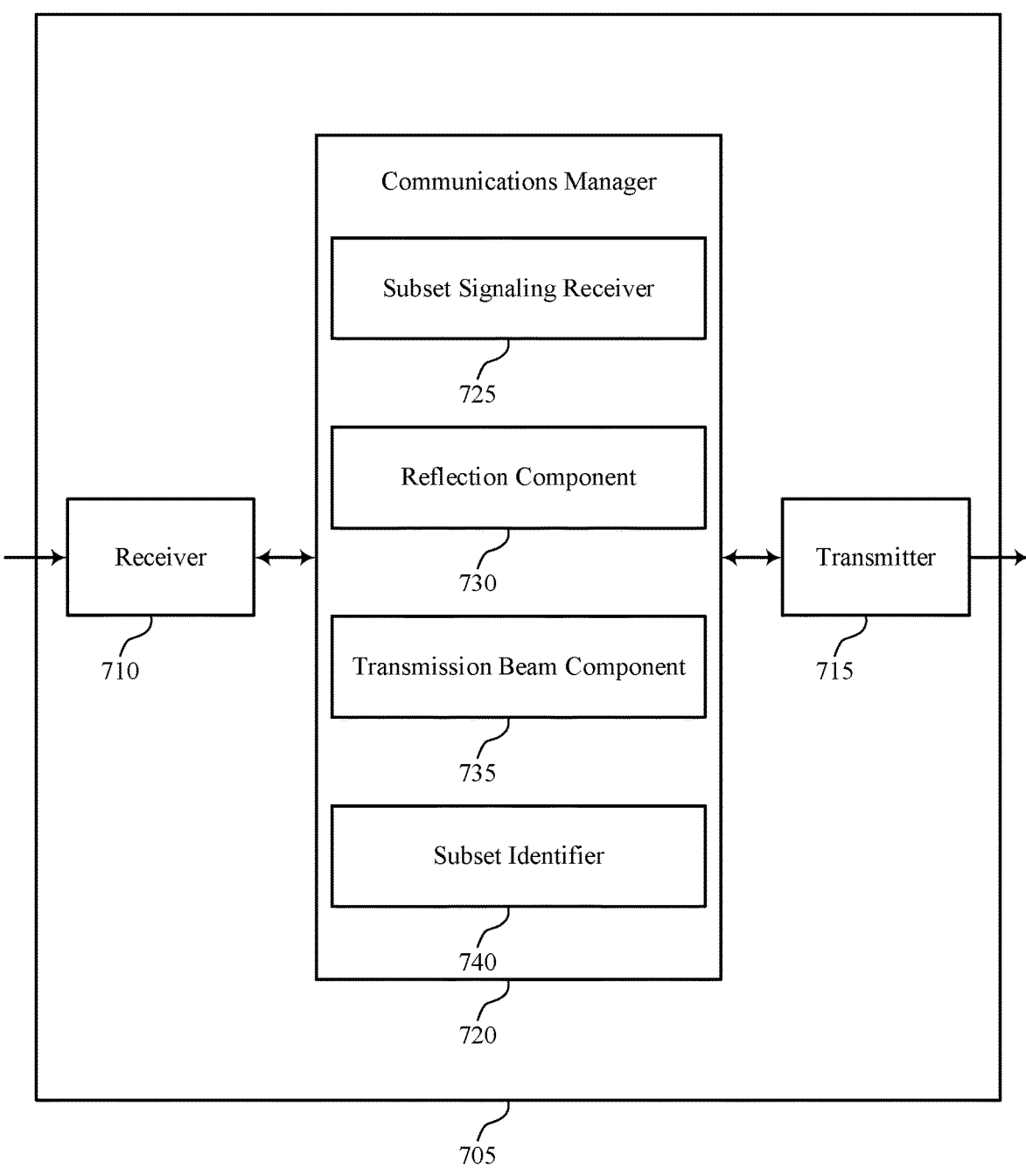

FIG. 7 shows a block diagram 700 of a device 705 that supports RIS optimization and control signaling in accordance with one or more aspects of the present disclosure. The device 705 may be an example of aspects of a device 605 or a wireless device 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to RIS optimization and control signaling). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to RIS optimization and control signaling). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of RIS optimization and control signaling as described herein. For example, the communications manager 720 may include a subset signaling receiver 725, a reflection component 730, a transmission beam component 735, a subset identifier 740, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communication at a first device including a set of multiple reflective elements in accordance with examples as disclosed herein. The subset signaling receiver 725 may be configured as or otherwise support a means for receiving signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements. The reflection component 730 may be configured as or otherwise support a means for reflecting one or more signals from a second device based on the first phase configuration for the first subset of reflective elements and the second phase configuration for the second subset of reflective elements.

Additionally, or alternatively, the communications manager 720 may support wireless communication at a first device in accordance with examples as disclosed herein. The transmission beam component 735 may be configured as or otherwise support a means for receiving signaling indicating a transmission beam of a second device, the transmission beam corresponding to an angle of arrival at a set of multiple reflective elements of the first device and an angle of departure from the set of multiple reflective elements. The subset identifier 740 may be configured as or otherwise support a means for identifying, based on the angle of arrival and the angle of departure, a first subset of reflective elements corresponding to a first phase configuration and a second subset of reflective elements corresponding to a second phase configuration. The reflection component 730 may be configured as or otherwise support a means for reflecting one or more signals from the second device based on the first phase configuration for the first subset of reflective elements and the second phase configuration for the second subset of reflective elements.

Figure 8:
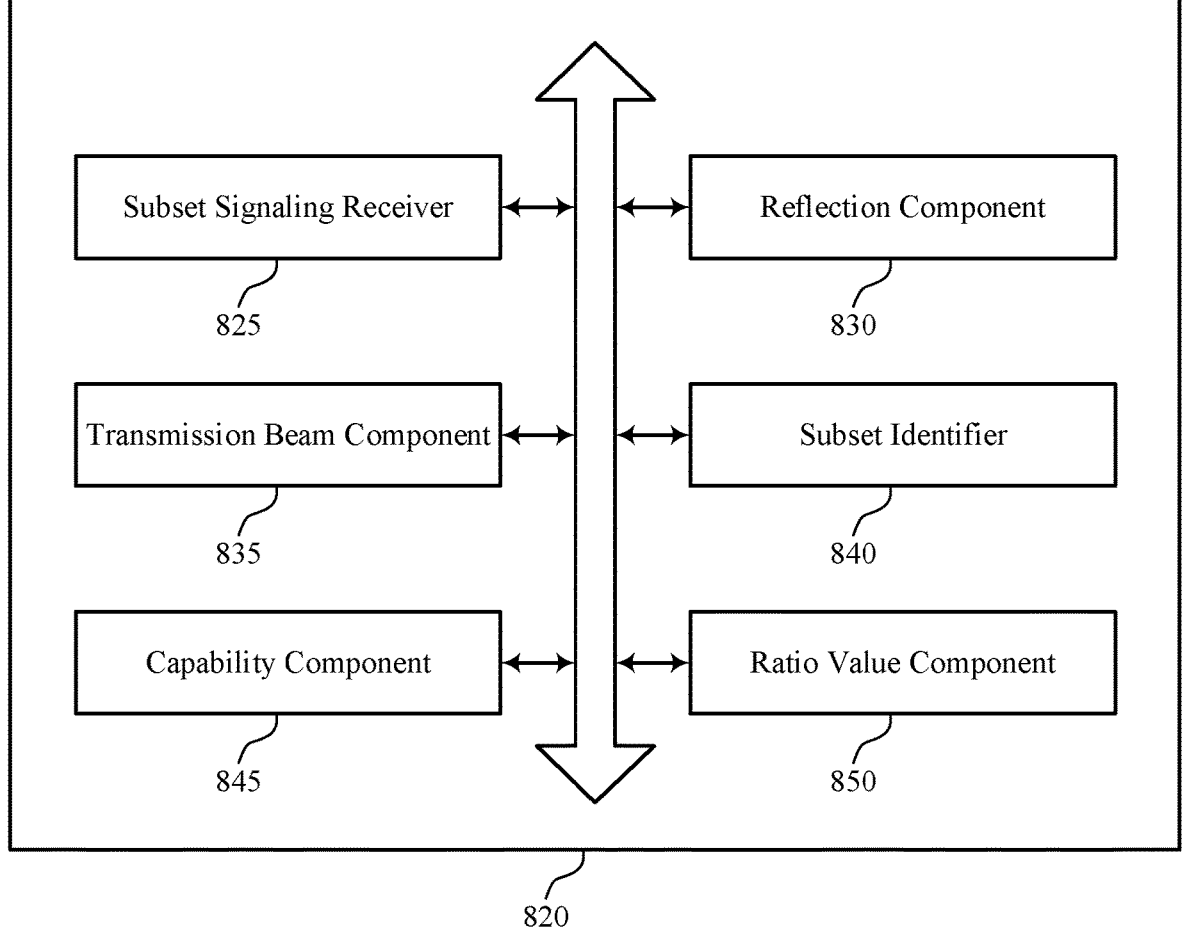
FIG. 8 shows a block diagram of a communications manager that supports RIS optimization and control signaling in accordance with one or more aspects of the present disclosure.

FIG. 8 shows a block diagram 800 of a communications manager 820 that supports RIS optimization and control signaling in accordance with one or more aspects of the present disclosure. The communications manager 820 may be an example of aspects of a communications manager 620, a communications manager 720, or both, as described herein. The communications manager 820, or various components thereof, may be an example of means for performing various aspects of RIS optimization and control signaling as described herein. For example, the communications manager 820 may include a subset signaling receiver 825, a reflection component 830, a transmission beam component 835, a subset identifier 840, a capability component 845, a ratio value component 850, or any combination thereof. Each of these components may communicate, directly or indirectly, with one another (e.g., via one or more buses).

The communications manager 820 may support wireless communication at a first device including a set of multiple reflective elements in accordance with examples as disclosed herein. The subset signaling receiver 825 may be configured as or otherwise support a means for receiving signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements. The reflection component 830 may be configured as or otherwise support a means for reflecting one or more signals from a second device based on the first phase configuration for the first subset of reflective elements and the second phase configuration for the second subset of reflective elements.

In some examples, to support receiving the signaling, the subset signaling receiver 825 may be configured as or otherwise support a means for receiving the signaling indicating a ratio of a first quantity of reflective elements in the first subset and a second quantity of reflective elements in the second subset.

In some examples, the ratio value component 850 may be configured as or otherwise support a means for receiving an indication of a set of integers corresponding to preconfigured ratio values, where receiving the signaling indicating the ratio includes receiving an indication of a first integer of the ratio from the set of integers and a second integer of the ratio from the set of integers, the first integer associated with the first subset and the second integer associated with the second subset.

In some examples, to support receiving the signaling indicating the ratio, the subset signaling receiver 825 may be configured as or otherwise support a means for receiving a first integer of the ratio associated with the first subset and a second integer of the ratio associated with the second subset.

In some examples, to support receiving the signaling indicating the ratio, the subset signaling receiver 825 may be configured as or otherwise support a means for receiving a first integer of the ratio associated with the first subset and a second integer indicating a difference between the first integer and a third integer of the ratio associated with the second subset.

In some examples, the ratio includes a first quantity of reflective elements from the first subset of reflective elements and a second quantity of reflective elements from the second subset of reflective elements. In some examples, the interleaved reflective elements include the first quantity of reflective elements having the first phase configuration interleaved with the second quantity of reflective elements having the second phase configuration.

In some examples, the capability component 845 may be configured as or otherwise support a means for transmitting signaling indicating a capability of the first device, where receiving the signaling indicating the first subset and the second subset is based on the signaling indicating the capability of the first device.

In some examples, to support transmitting the signaling indicating the capability of the first device, the capability component 845 may be configured as or otherwise support a means for transmitting signaling indicating that each of the set of multiple reflective elements have the first phase configuration or the second phase configuration, or a quantity of the set of multiple reflective elements, or both.

In some examples, the reflection component 830 may be configured as or otherwise support a means for reflecting a first signal to the second device based on the first phase configuration for a third subset of reflective elements and the second phase configuration for a fourth subset of reflective elements. In some examples, the reflection component 830 may be configured as or otherwise support a means for reflecting a second signal to the second device based on the first phase configuration for a fifth subset of reflective elements different than the third subset and the second phase configuration for a sixth subset of reflective elements different than the fourth subset, where receiving the signaling is based on reflecting the first signal and the second signal.

In some examples, the first signal and the second signal include SRSs, PRACH signals, or a combination thereof.

In some examples, the first device includes a RIS.

Additionally, or alternatively, the communications manager 820 may support wireless communication at a first device in accordance with examples as disclosed herein. The transmission beam component 835 may be configured as or otherwise support a means for receiving signaling indicating a transmission beam of a second device, the transmission beam corresponding to an angle of arrival at a set of multiple reflective elements of the first device and an angle of departure from the set of multiple reflective elements. The subset identifier 840 may be configured as or otherwise support a means for identifying, based on the angle of arrival and the angle of departure, a first subset of reflective elements corresponding to a first phase configuration and a second subset of reflective elements corresponding to a second phase configuration. In some examples, the reflection component 830 may be configured as or otherwise support a means for reflecting one or more signals from the second device based on the first phase configuration for the first subset of reflective elements and the second phase configuration for the second subset of reflective elements.

In some examples, to support receiving the signaling indicating the transmission beam, the transmission beam component 835 may be configured as or otherwise support a means for receiving signaling indicating an index associated with the transmission beam of the second device from a set of multiple transmission beams of the second device.

In some examples, to support receiving the signaling indicating the transmission beam, the transmission beam component 835 may be configured as or otherwise support a means for receiving signaling indicating a summation associated with the angle of arrival and the angle of departure of the transmission beam.

In some examples, the transmission beam corresponds to a horizontal angle of arrival at the set of multiple reflective elements, a vertical angle of arrival at the set of multiple reflective elements, a horizontal angle of departure from the set of multiple reflective elements, and a vertical angle of departure from the set of multiple reflective elements. In some examples, receiving the signaling indicating the transmission beam includes receiving a first summation associated with the horizontal angle of arrival, the vertical angle of arrival, the horizontal angle of departure, and the vertical angle of departure and a second summation associated with the vertical angle of arrival and the vertical angle of departure.

In some examples, the capability component 845 may be configured as or otherwise support a means for transmitting signaling indicating a capability of the first device, where receiving the signaling indicating the transmission beam of the second device is based on transmitting the signaling indicating the capability of the first device.

In some examples, to support transmitting the signaling indicating the capability of the first device, the capability component 845 may be configured as or otherwise support a means for transmitting signaling indicating that each of the set of multiple reflective elements have the first phase configuration or the second phase configuration, signaling indicating a quantity of the set of multiple reflective elements, or both.

In some examples, the reflection component 830 may be configured as or otherwise support a means for reflecting a first signal to the second device based on the first phase configuration for a third subset of reflective elements and the second phase configuration for a fourth subset of reflective elements. In some examples, the reflection component 830 may be configured as or otherwise support a means for reflecting a second signal to the second device based on the first phase configuration for a fifth subset of reflective elements different than the third subset and the second phase configuration for a sixth subset of reflective elements different than the fourth subset, where receiving the signaling indicating the transmission beam of the second device is based on reflecting the first signal and the second signal.

In some examples, the first signal and the second signal include SRSs, PRACH signals, or a combination thereof.

In some examples, the first device includes a RIS.

Figure 9:
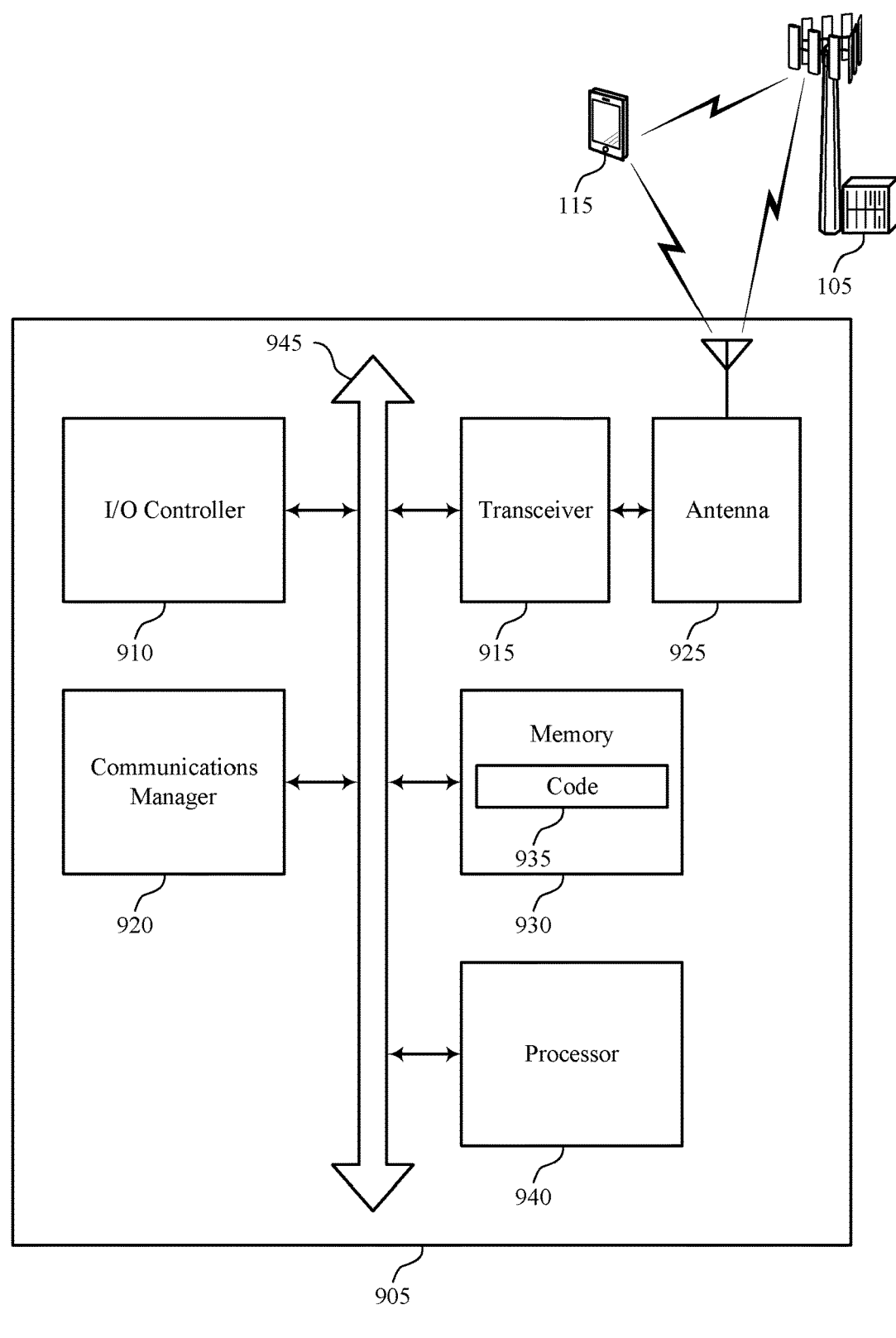
FIG. 9 shows a diagram of a system including a device that supports RIS optimization and control signaling in accordance with one or more aspects of the present disclosure.

FIG. 9 shows a diagram of a system 900 including a device 905 that supports RIS optimization and control signaling in accordance with one or more aspects of the present disclosure. The device 905 may be an example of or include the components of a device 605, a device 705, or a wireless device as described herein. The device 905 may include components for bi-directional voice and data communications including components for transmitting and receiving communications, such as a communications manager 920, an I/O controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include RAM and ROM. The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting RIS optimization and control signaling). For example, the device 905 or a component of the device 905 may include a processor 940 and memory 930 coupled with or to the processor 940, the processor 940 and memory 930 configured to perform various functions described herein.

The communications manager 920 may support wireless communication at a first device including a set of multiple reflective elements in accordance with examples as disclosed herein. For example, the communications manager 920 may be configured as or otherwise support a means for receiving signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements. The communications manager 920 may be configured as or otherwise support a means for reflecting one or more signals from a second device based on the first phase configuration for the first subset of reflective elements and the second phase configuration for the second subset of reflective elements.

Additionally, or alternatively, the communications manager 920 may support wireless communication at a first device in accordance with examples as disclosed herein. For example, the communications manager 920 may be configured as or otherwise support a means for receiving signaling indicating a transmission beam of a second device, the transmission beam corresponding to an angle of arrival at a set of multiple reflective elements of the first device and an angle of departure from the set of multiple reflective elements. The communications manager 920 may be configured as or otherwise support a means for identifying, based on the angle of arrival and the angle of departure, a first subset of reflective elements corresponding to a first phase configuration and a second subset of reflective elements corresponding to a second phase configuration. The communications manager 920 may be configured as or otherwise support a means for reflecting one or more signals from the second device based on the first phase configuration for the first subset of reflective elements and the second phase configuration for the second subset of reflective elements.

By including or configuring the communications manager 920 in accordance with examples as described herein, the device 905 may support techniques for more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of RIS optimization and control signaling as described herein, or the processor 940 and the memory 930 may be otherwise configured to perform or support such operations.

Figure 10:
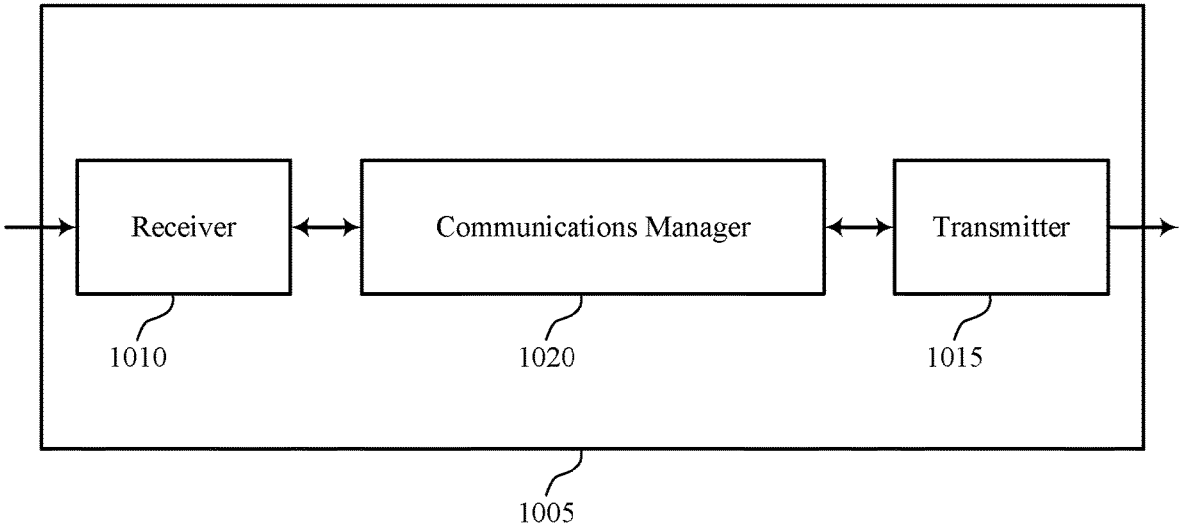
FIGS. 10 and 11 show block diagrams of devices that support RIS optimization and control signaling in accordance with one or more aspects of the present disclosure.

FIG. 10 shows a block diagram 1000 of a device 1005 that supports RIS optimization and control signaling in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of RIS optimization and control signaling as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication at a first device in accordance with examples as disclosed herein. For example, the communications manager 1020 may be configured as or otherwise support a means for transmitting signaling to a second device including a set of multiple reflective elements, the signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements. The communications manager 1020 may be configured as or otherwise support a means for transmitting one or more signals to the second device based on the first phase configuration for the first subset of reflective elements and the second phase configuration for the second subset of reflective elements.

Additionally, or alternatively, the communications manager 1020 may support wireless communication at a first device in accordance with examples as disclosed herein. For example, the communications manager 1020 may be configured as or otherwise support a means for transmitting signaling indicating a transmission beam of the first device, the transmission beam corresponding to an angle of arrival at a set of multiple reflective elements of a second device and an angle of departure from the set of multiple reflective elements. The communications manager 1020 may be configured as or otherwise support a means for transmitting, to the second device, one or more signals via the transmission beam based on transmitting the signaling indicating the transmission beam.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for more efficient utilization of communication resources.

Figure 11:
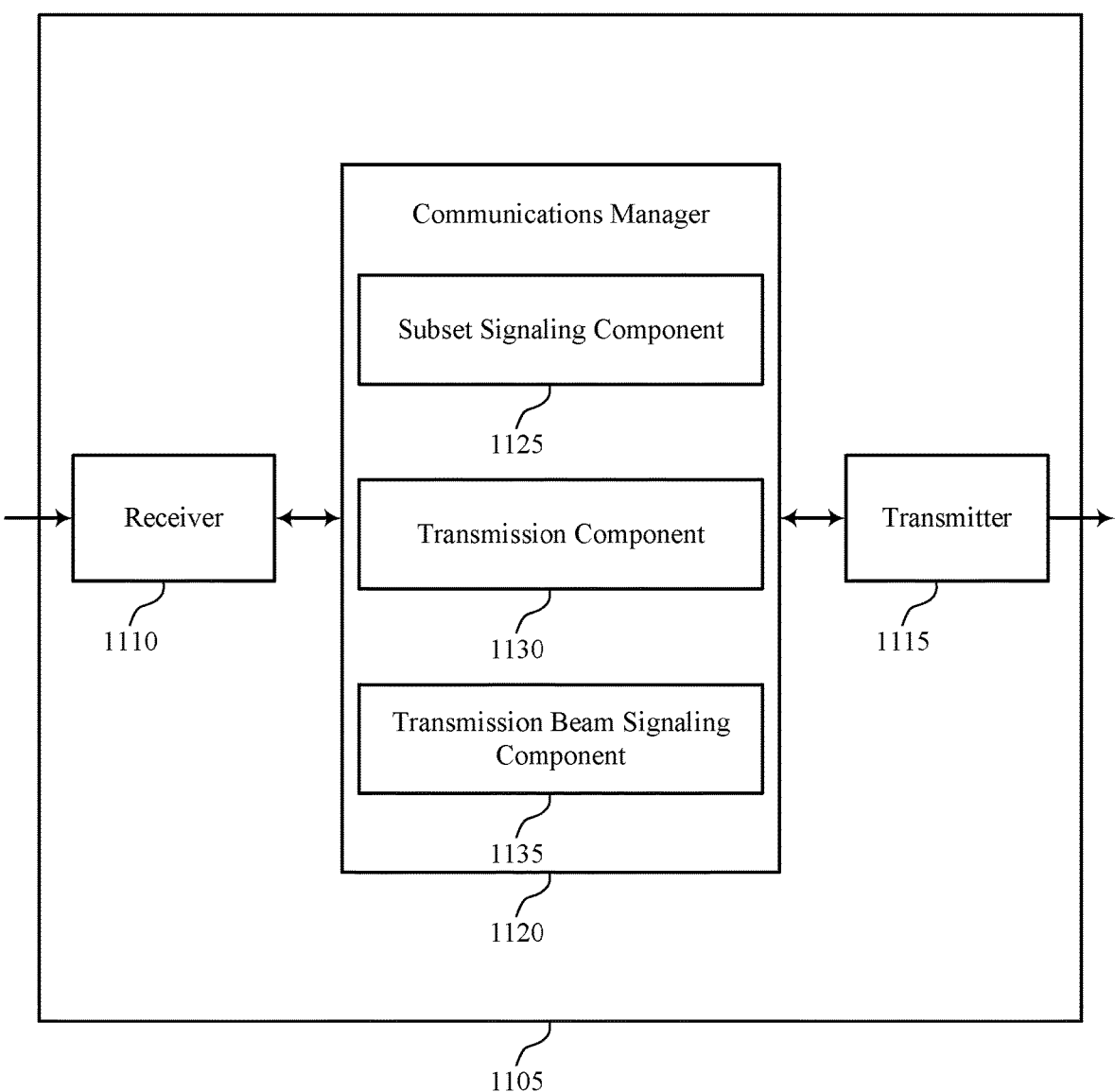

FIG. 11 shows a block diagram 1100 of a device 1105 that supports RIS optimization and control signaling in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of RIS optimization and control signaling as described herein. For example, the communications manager 1120 may include a subset signaling component 1125, a transmission component 1130, a transmission beam signaling component 1135, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communication at a first device in accordance with examples as disclosed herein. The subset signaling component 1125 may be configured as or otherwise support a means for transmitting signaling to a second device including a set of multiple reflective elements, the signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements. The transmission component 1130 may be configured as or otherwise support a means for transmitting one or more signals to the second device based on the first phase configuration for the first subset of reflective elements and the second phase configuration for the second subset of reflective elements.

Additionally, or alternatively, the communications manager 1120 may support wireless communication at a first device in accordance with examples as disclosed herein. The transmission beam signaling component 1135 may be configured as or otherwise support a means for transmitting signaling indicating a transmission beam of the first device, the transmission beam corresponding to an angle of arrival at a set of multiple reflective elements of a second device and an angle of departure from the set of multiple reflective elements. The transmission component 1130 may be configured as or otherwise support a means for transmitting, to the second device, one or more signals via the transmission beam based on transmitting the signaling indicating the transmission beam.

Figure 12:
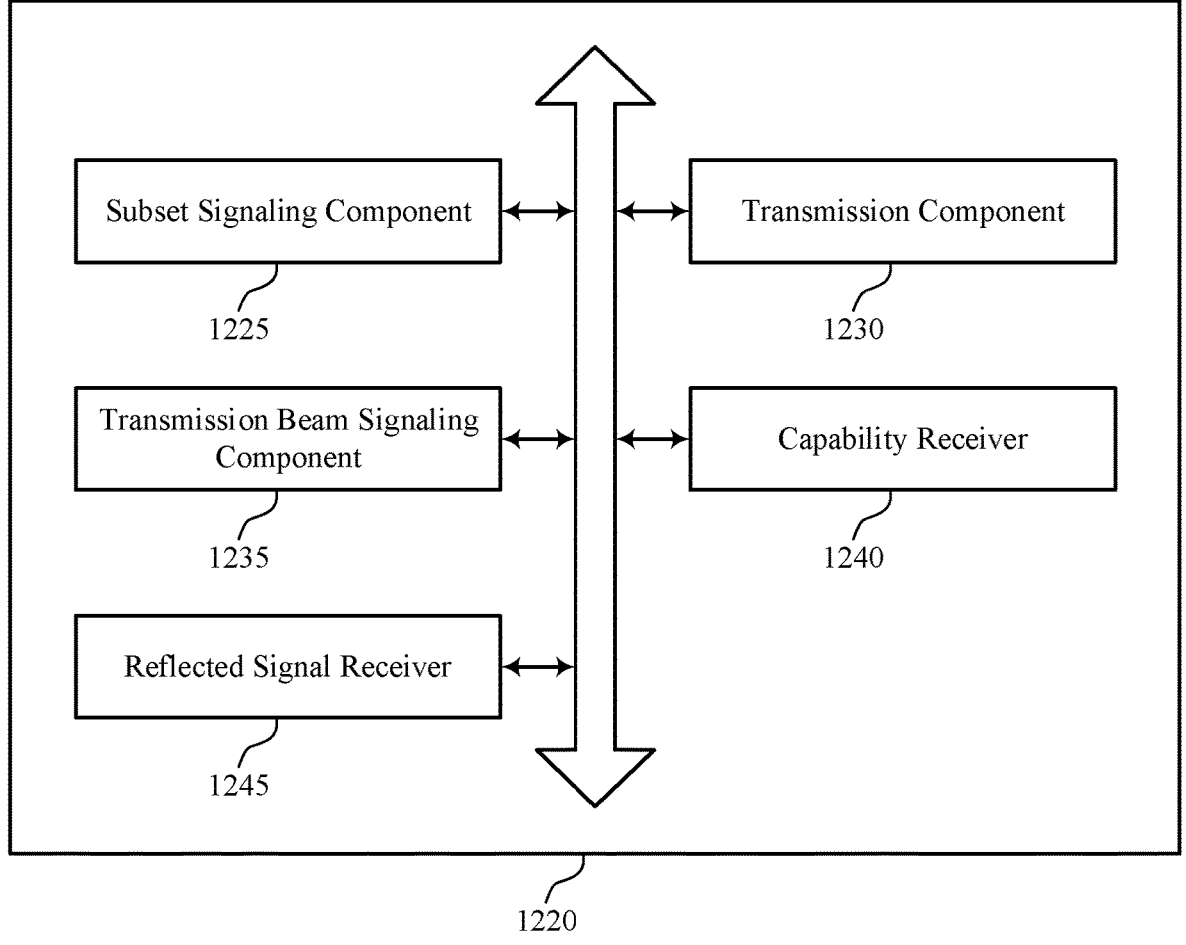
FIG. 12 shows a block diagram of a communications manager that supports RIS optimization and control signaling in accordance with one or more aspects of the present disclosure.

FIG. 12 shows a block diagram 1200 of a communications manager 1220 that supports RIS optimization and control signaling in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of RIS optimization and control signaling as described herein. For example, the communications manager 1220 may include a subset signaling component 1225, a transmission component 1230, a transmission beam signaling component 1235, a capability receiver 1240, a reflected signal receiver 1245, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communication at a first device in accordance with examples as disclosed herein. The subset signaling component 1225 may be configured as or otherwise support a means for transmitting signaling to a second device including a set of multiple reflective elements, the signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements. The transmission component 1230 may be configured as or otherwise support a means for transmitting one or more signals to the second device based on the first phase configuration for the first subset of reflective elements and the second phase configuration for the second subset of reflective elements.

In some examples, to support transmitting the signaling, the subset signaling component 1225 may be configured as or otherwise support a means for transmitting the signaling indicating a ratio of a first quantity of reflective elements in the first subset and a second quantity of reflective elements in the second subset.

In some examples, the subset signaling component 1225 may be configured as or otherwise support a means for transmitting a set of integers corresponding to preconfigured ratio values, where transmitting the signaling indicating the ratio includes transmitting an indication of a first integer of the ratio from the set of integers and a second integer of the ratio from the set of integers, the first integer associated with the first subset and the second integer associated with the second subset.

In some examples, to support transmitting the signaling indicating the ratio, the subset signaling component 1225 may be configured as or otherwise support a means for transmitting a first integer of the ratio associated with the first subset and a second integer of the ratio associated with the second subset.

In some examples, to support transmitting the signaling indicating the ratio, the subset signaling component 1225 may be configured as or otherwise support a means for transmitting a first integer of the ratio associated with the first subset and a second integer indicating a difference between the first integer and a third integer of the ratio associated with the second subset.

In some examples, the ratio includes a first quantity of reflective elements from the first subset of reflective elements and a second quantity of reflective elements from the second subset of reflective elements. In some examples, the interleaved reflective elements include the first quantity of reflective elements having the first phase configuration interleaved with the second quantity of reflective elements having the second phase configuration.

In some examples, the capability receiver 1240 may be configured as or otherwise support a means for receiving signaling indicating a capability of the second device, where transmitting the signaling indicating the first subset and the second subset is based on receiving the signaling indicating the capability of the first device.

In some examples, to support receiving the signaling indicating the capability of the first device, the capability receiver 1240 may be configured as or otherwise support a means for receiving signaling indicating that each of the set of multiple reflective elements have the first phase configuration or the second phase configuration, signaling indicating a quantity of the set of multiple reflective elements, or both.

In some examples, the reflected signal receiver 1245 may be configured as or otherwise support a means for receiving a first signal reflected by the second device based on the first phase configuration for a third subset of reflective elements and the second phase configuration for a fourth subset of reflective elements. In some examples, the reflected signal receiver 1245 may be configured as or otherwise support a means for receiving a second signal reflected by the second device based on the first phase configuration for a fifth subset of reflective elements different than the third subset and the second phase configuration for a sixth subset of reflective elements different than the fourth subset, where transmitting the signaling is based on reflecting the first signal and the second signal.

In some examples, the first signal and the second signal include SRSs, PRACH signals, or a combination thereof.

In some examples, the second device includes a RIS.

Additionally, or alternatively, the communications manager 1220 may support wireless communication at a first device in accordance with examples as disclosed herein. The transmission beam signaling component 1235 may be configured as or otherwise support a means for transmitting signaling indicating a transmission beam of the first device, the transmission beam corresponding to an angle of arrival at a set of multiple reflective elements of a second device and an angle of departure from the set of multiple reflective elements. In some examples, the transmission component 1230 may be configured as or otherwise support a means for transmitting, to the second device, one or more signals via the transmission beam based on transmitting the signaling indicating the transmission beam.

In some examples, to support transmitting the signaling indicating the transmission beam, the transmission beam signaling component 1235 may be configured as or otherwise support a means for transmitting signaling indicating an index associated with the transmission beam of the first device from a set of multiple transmission beams of the first device.

In some examples, to support transmitting the signaling indicating the transmission beam, the transmission beam signaling component 1235 may be configured as or otherwise support a means for transmitting signaling indicating a summation associated with the angle of arrival and the angle of departure of the transmission beam.

In some examples, the transmission beam corresponds to a horizontal angle of arrival at the set of multiple reflective elements, a vertical angle of arrival at the set of multiple reflective elements, a horizontal angle of departure from the set of multiple reflective elements, and a vertical angle of departure from the set of multiple reflective elements. In some examples, transmitting the signaling indicating the transmission beam includes transmitting a first summation associated with the horizontal angle of arrival, the vertical angle of arrival, the horizontal angle of departure, and the vertical angle of departure and a second summation associated with the vertical angle of arrival and the vertical angle of departure.

In some examples, the capability receiver 1240 may be configured as or otherwise support a means for receiving signaling indicating a capability of the second device, where transmitting the signaling indicating the transmission beam of the first device is based on receiving the signaling indicating the capability of the second device.

In some examples, to support receiving the signaling indicating the capability of the second device, the capability receiver 1240 may be configured as or otherwise support a means for receiving signaling indicating that each of the set of multiple reflective elements have a first phase configuration or a second phase configuration, signaling indicating a quantity of the set of multiple reflective elements, or both.

In some examples, the reflected signal receiver 1245 may be configured as or otherwise support a means for receiving a first signal reflected by the second device based on a first phase configuration for a first subset of reflective elements and a second phase configuration for a second subset of reflective elements, where the first subset of reflective elements and the second subset of reflective elements include interleaved reflective elements of the set of multiple reflective elements of the second device. In some examples, the reflected signal receiver 1245 may be configured as or otherwise support a means for receiving a second signal reflected by the second device based on the first phase configuration for a third subset of reflective elements different than the first subset and the second phase configuration for a fourth subset of reflective elements different than the second subset, where transmitting the signaling indicating the transmission beam of the first device is based on receiving the first signal and the second signal.

In some examples, the first signal and the second signal include SRSs, PRACH signals, or a combination thereof.

In some examples, the second device includes a RIS.

Figure 13:
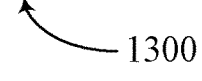
FIG. 13 shows a diagram of a system including a device that supports RIS optimization and control signaling in accordance with one or more aspects of the present disclosure.

FIG. 13 shows a diagram of a system 1300 including a device 1305 that supports RIS optimization and control signaling in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. The transceiver 1310, or the transceiver 1310 and one or more antennas 1315 or wired interfaces, where applicable, may be an example of a transmitter 1015, a transmitter 1115, a receiver 1010, a receiver 1110, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting RIS optimization and control signaling). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communication at a first device in accordance with examples as disclosed herein. For example, the communications manager 1320 may be configured as or otherwise support a means for transmitting signaling to a second device including a set of multiple reflective elements, the signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements. The communications manager 1320 may be configured as or otherwise support a means for transmitting one or more signals to the second device based on the first phase configuration for the first subset of reflective elements and the second phase configuration for the second subset of reflective elements.

Additionally, or alternatively, the communications manager 1320 may support wireless communication at a first device in accordance with examples as disclosed herein. For example, the communications manager 1320 may be configured as or otherwise support a means for transmitting signaling indicating a transmission beam of the first device, the transmission beam corresponding to an angle of arrival at a set of multiple reflective elements of a second device and an angle of departure from the set of multiple reflective elements. The communications manager 1320 may be configured as or otherwise support a means for transmitting, to the second device, one or more signals via the transmission beam based on transmitting the signaling indicating the transmission beam.

By including or configuring the communications manager 1320 in accordance with examples as described herein, the device 1305 may support more efficient utilization of communication resources, improved coordination between devices, longer battery life, improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the processor 1335, the memory 1325, the code 1330, the transceiver 1310, or any combination thereof. For example, the code 1330 may include instructions executable by the processor 1335 to cause the device 1305 to perform various aspects of RIS optimization and control signaling as described herein, or the processor 1335 and the memory 1325 may be otherwise configured to perform or support such operations.

FIG. 14 shows a flowchart illustrating a method 1400 that supports RIS optimization and control signaling in accordance with one or more aspects of the present disclosure. The operations of the method 1400 may be implemented by a wireless device or its components as described herein. For example, the operations of the method 1400 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1405, the method may include receiving signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements. The operations of 1405 may be performed in accordance with examples as disclosed herein. In some examples, aspects of the operations of 1405 may be performed by a subset signaling receiver 825 as described with reference to FIG. 8.

At 1410, the method may include reflecting one or more signals from a second device based on the first phase configuration for the first subset of reflective elements and the second phase configuration for the second subset of reflective elements. The operations of 1410 may be performed in accordance with examples as disclosed herein. In some examples, aspects of the operations of 1410 may be performed by a reflection component 830 as described with reference to FIG. 8.

FIG. 15 shows a flowchart illustrating a method 1500 that supports RIS optimization and control signaling in accordance with one or more aspects of the present disclosure. The operations of the method 1500 may be implemented by a wireless device or its components as described herein. For example, the operations of the method 1500 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1505, the method may include receiving signaling indicating a ratio of a first quantity of reflective elements in a first subset corresponding to a first phase configuration and a second quantity of reflective elements in a second subset corresponding to a second phase configuration, where the first subset of reflective elements and the second subset of reflective elements include interleaved reflective elements of the set of multiple reflective elements. The operations of 1505 may be performed in accordance with examples as disclosed herein. In some examples, aspects of the operations of 1505 may be performed by a subset signaling receiver 825 as described with reference to FIG. 8.

At 1510, the method may include reflecting one or more signals from a second device based on the first phase configuration for the first subset of reflective elements and the second phase configuration for the second subset of reflective elements. The operations of 1510 may be performed in accordance with examples as disclosed herein. In some examples, aspects of the operations of 1510 may be performed by a reflection component 830 as described with reference to FIG. 8.

FIG. 16 shows a flowchart illustrating a method 1600 that supports RIS optimization and control signaling in accordance with one or more aspects of the present disclosure. The operations of the method 1600 may be implemented by a wireless device or its components as described herein. For example, the operations of the method 1600 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1605, the method may include transmitting signaling indicating a capability of the first device. The operations of 1605 may be performed in accordance with examples as disclosed herein. In some examples, aspects of the operations of 1605 may be performed by a capability component 845 as described with reference to FIG. 8.

At 1610, the method may include receiving, based on transmitting the signaling indicating the capability of the first device, signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements. The operations of 1610 may be performed in accordance with examples as disclosed herein. In some examples, aspects of the operations of 1610 may be performed by a subset signaling receiver 825 as described with reference to FIG. 8.

At 1615, the method may include reflecting one or more signals from a second device based on the first phase configuration for the first subset of reflective elements and the second phase configuration for the second subset of reflective elements. The operations of 1615 may be performed in accordance with examples as disclosed herein. In some examples, aspects of the operations of 1615 may be performed by a reflection component 830 as described with reference to FIG. 8.

FIG. 17 shows a flowchart illustrating a method 1700 that supports RIS optimization and control signaling in accordance with one or more aspects of the present disclosure. The operations of the method 1700 may be implemented by a wireless device or its components as described herein. For example, the operations of the method 1700 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1705, the method may include receiving signaling indicating a transmission beam of a second device, the transmission beam corresponding to an angle of arrival at a set of multiple reflective elements of the first device and an angle of departure from the set of multiple reflective elements. The operations of 1705 may be performed in accordance with examples as disclosed herein. In some examples, aspects of the operations of 1705 may be performed by a transmission beam component 835 as described with reference to FIG. 8.

At 1710, the method may include identifying, based on the angle of arrival and the angle of departure, a first subset of reflective elements corresponding to a first phase configuration and a second subset of reflective elements corresponding to a second phase configuration. The operations of 1710 may be performed in accordance with examples as disclosed herein. In some examples, aspects of the operations of 1710 may be performed by a subset identifier 840 as described with reference to FIG. 8.

At 1715, the method may include reflecting one or more signals from the second device based on the first phase configuration for the first subset of reflective elements and the second phase configuration for the second subset of reflective elements. The operations of 1715 may be performed in accordance with examples as disclosed herein. In some examples, aspects of the operations of 1715 may be performed by a reflection component 830 as described with reference to FIG. 8.

FIG. 18 shows a flowchart illustrating a method 1800 that supports RIS optimization and control signaling in accordance with one or more aspects of the present disclosure. The operations of the method 1800 may be implemented by a wireless device or its components as described herein. For example, the operations of the method 1800 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1805, the method may include receiving signaling indicating an index associated with a transmission beam from a set of multiple transmission beams of the second device transmission beam of a second device, the transmission beam corresponding to an angle of arrival at a set of multiple reflective elements of the first device and an angle of departure from the set of multiple reflective elements. The operations of 1805 may be performed in accordance with examples as disclosed herein. In some examples, aspects of the operations of 1805 may be performed by a transmission beam component 835 as described with reference to FIG. 8.

At 1810, the method may include identifying, based on the angle of arrival and the angle of departure, a first subset of reflective elements corresponding to a first phase configuration and a second subset of reflective elements corresponding to a second phase configuration. The operations of 1810 may be performed in accordance with examples as disclosed herein. In some examples, aspects of the operations of 1810 may be performed by a subset identifier 840 as described with reference to FIG. 8.

At 1815, the method may include reflecting one or more signals from the second device based on the first phase configuration for the first subset of reflective elements and the second phase configuration for the second subset of reflective elements. The operations of 1815 may be performed in accordance with examples as disclosed herein. In some examples, aspects of the operations of 1815 may be performed by a reflection component 830 as described with reference to FIG. 8.

FIG. 19 shows a flowchart illustrating a method 1900 that supports RIS optimization and control signaling in accordance with one or more aspects of the present disclosure. The operations of the method 1900 may be implemented by a wireless device or its components as described herein. For example, the operations of the method 1900 may be performed by a wireless device as described with reference to FIGS. 1 through 9. In some examples, a wireless device may execute a set of instructions to control the functional elements of the wireless device to perform the described functions. Additionally, or alternatively, the wireless device may perform aspects of the described functions using special-purpose hardware.

At 1905, the method may include receiving signaling indicating a summation associated with an angle of arrival of a transmission beam of a second device and an angle of departure of the transmission beam, the angle of arrival at a plurality of reflective elements of the first device and the angle of departure from the plurality of reflective elements. The operations of 1905 may be performed in accordance with examples as disclosed herein. In some examples, aspects of the operations of 1905 may be performed by a transmission beam component 835 as described with reference to FIG. 8.

At 1910, the method may include identifying, based on the angle of arrival and the angle of departure, a first subset of reflective elements corresponding to a first phase configuration and a second subset of reflective elements corresponding to a second phase configuration. The operations of 1910 may be performed in accordance with examples as disclosed herein. In some examples, aspects of the operations of 1910 may be performed by a subset identifier 840 as described with reference to FIG. 8.

At 1915, the method may include reflecting one or more signals from the second device based on the first phase configuration for the first subset of reflective elements and the second phase configuration for the second subset of reflective elements. The operations of 1915 may be performed in accordance with examples as disclosed herein. In some examples, aspects of the operations of 1915 may be performed by a reflection component 830 as described with reference to FIG. 8.

FIG. 20 shows a flowchart illustrating a method 2000 that supports RIS optimization and control signaling in accordance with one or more aspects of the present disclosure. The operations of the method 2000 may be implemented by a network entity or its components as described herein. For example, the operations of the method 2000 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2005, the method may include transmitting signaling to a second device including a set of multiple reflective elements, the signaling indicating a first subset of reflective elements corresponding to a first phase configuration and a second subset of reflective elements corresponding to a second phase configuration, where the first subset of reflective elements and the second subset of reflective elements include interleaved reflective elements of the set of multiple reflective elements. The operations of 2005 may be performed in accordance with examples as disclosed herein. In some examples, aspects of the operations of 2005 may be performed by a subset signaling component 1225 as described with reference to FIG. 12.

At 2010, the method may include transmitting one or more signals to the second device based on the first phase configuration for the first subset of reflective elements and the second phase configuration for the second subset of reflective elements. The operations of 2010 may be performed in accordance with examples as disclosed herein. In some examples, aspects of the operations of 2010 may be performed by a transmission component 1230 as described with reference to FIG. 12.

FIG. 21 shows a flowchart illustrating a method 2100 that supports RIS optimization and control signaling in accordance with one or more aspects of the present disclosure. The operations of the method 2100 may be implemented by a network entity or its components as described herein. For example, the operations of the method 2100 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2105, the method may include transmitting signaling to a second device comprising a plurality of reflective elements, the signaling indicating a ratio of a first quantity of reflective elements in a first subset corresponding to a first phase configuration and a second quantity of reflective elements in a second subset of corresponding to a second phase configuration, wherein the first subset of reflective elements and the second subset of reflective elements comprise interleaved reflective elements of the plurality of reflective elements. The operations of 2105 may be performed in accordance with examples as disclosed herein. In some examples, aspects of the operations of 2105 may be performed by a subset signaling component 1225 as described with reference to FIG. 12.

At 2110, the method may include transmitting one or more signals to the second device based on the first phase configuration for the first subset of reflective elements and the second phase configuration for the second subset of reflective elements. The operations of 2110 may be performed in accordance with examples as disclosed herein. In some examples, aspects of the operations of 2110 may be performed by a transmission component 1230 as described with reference to FIG. 12.

FIG. 22 shows a flowchart illustrating a method 2200 that supports RIS optimization and control signaling in accordance with one or more aspects of the present disclosure. The operations of the method 2200 may be implemented by a network entity or its components as described herein. For example, the operations of the method 2200 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2205, the method may include transmitting signaling indicating a transmission beam of the first device, the transmission beam corresponding to an angle of arrival at a set of multiple reflective elements of a second device and an angle of departure from the set of multiple reflective elements. The operations of 2205 may be performed in accordance with examples as disclosed herein. In some examples, aspects of the operations of 2205 may be performed by a transmission beam signaling component 1235 as described with reference to FIG. 12.

At 2210, the method may include transmitting, to the second device, one or more signals via the transmission beam based on transmitting the signaling indicating the transmission beam. The operations of 2210 may be performed in accordance with examples as disclosed herein. In some examples, aspects of the operations of 2210 may be performed by a transmission component 1230 as described with reference to FIG. 12.

FIG. 23 shows a flowchart illustrating a method 2300 that supports RIS optimization and control signaling in accordance with one or more aspects of the present disclosure. The operations of the method 2300 may be implemented by a network entity or its components as described herein. For example, the operations of the method 2300 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2305, the method may include transmitting signaling indicating an index associated with a transmission beam from multiple transmission beams of the first device, the transmission beam corresponding to an angle of arrival at a plurality of reflective elements of a second device and an angle of departure from the plurality of reflective elements. The operations of 2305 may be performed in accordance with examples as disclosed herein. In some examples, aspects of the operations of 2305 may be performed by a transmission beam signaling component 1235 as described with reference to FIG. 12.

At 2310, the method may include transmitting, to the second device, one or more signals via the transmission beam based on transmitting the signaling indicating the transmission beam. The operations of 2310 may be performed in accordance with examples as disclosed herein. In some examples, aspects of the operations of 2310 may be performed by a transmission component 1230 as described with reference to FIG. 12.

FIG. 24 shows a flowchart illustrating a method 2400 that supports RIS optimization and control signaling in accordance with one or more aspects of the present disclosure. The operations of the method 2400 may be implemented by a network entity or its components as described herein. For example, the operations of the method 2400 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 2405, the method may include transmitting signaling indicating an index associated with a transmission beam from a plurality of transmission beams of the first device, the transmission beam corresponding to an angle of arrival at a plurality of reflective elements of a second device and an angle of departure from the plurality of reflective elements. The operations of 2405 may be performed in accordance with examples as disclosed herein. In some examples, aspects of the operations of 2405 may be performed by a transmission beam signaling component 1235 as described with reference to FIG. 12.

At 2410, the method may include transmitting, to the second device, one or more signals via the transmission beam based on transmitting the signaling indicating the transmission beam. The operations of 2410 may be performed in accordance with examples as disclosed herein. In some examples, aspects of the operations of 2410 may be performed by a transmission component 1230 as described with reference to FIG. 12.

The following provides an overview of aspects of the present disclosure:

Aspect 1: A method for wireless communication at a first device comprising a plurality of reflective elements, the method comprising: receiving signaling indicating a first subset of reflective elements corresponding to a first phase configuration and a second subset of reflective elements corresponding to a second phase configuration, wherein the first subset of reflective elements and the second subset of reflective elements comprise interleaved reflective elements of the plurality of reflective elements; and reflecting one or more signals from a second device based at least in part on the first phase configuration for the first subset of reflective elements and the second phase configuration for the second subset of reflective elements.

Aspect 2: The method of aspect 1, wherein receiving the signaling comprises: receiving the signaling indicating a ratio of a first quantity of reflective elements in the first subset and a second quantity of reflective elements in the second subset.

Aspect 3: The method of aspect 2, further comprising: receiving an indication of a set of integers corresponding to preconfigured ratio values, wherein receiving the signaling indicating the ratio comprises receiving an indication of a first integer of the ratio from the set of integers and a second integer of the ratio from the set of integers, the first integer associated with the first subset and the second integer associated with the second subset.

Aspect 4: The method of aspect 2, wherein receiving the signaling indicating the ratio comprises: receiving a first integer of the ratio associated with the first subset and a second integer of the ratio associated with the second subset.

Aspect 5: The method of aspect 2, wherein receiving the signaling indicating the ratio comprises: receiving a first integer of the ratio associated with the first subset and a second integer indicating a difference between the first integer and a third integer of the ratio associated with the second subset.

Aspect 6: The method of any of aspects 2 through 5, wherein the ratio comprises a first quantity of reflective elements from the first subset of reflective elements and a second quantity of reflective elements from the second subset of reflective elements; and the interleaved reflective elements comprise the first quantity of reflective elements having the first phase configuration interleaved with the second quantity of reflective elements having the second phase configuration.

Aspect 7: The method of any of aspects 1 through 6, further comprising: transmitting signaling indicating a capability of the first device, wherein receiving the signaling indicating the first subset and the second subset is based at least in part on the signaling indicating the capability of the first device.

Aspect 8: The method of aspect 7, wherein transmitting the signaling indicating the capability of the first device comprises: transmitting signaling indicating that each of the plurality of reflective elements have the first phase configuration or the second phase configuration, or a quantity of the plurality of reflective elements, or both.

Aspect 9: The method of any of aspects 1 through 8, further comprising: reflecting a first signal to the second device based at least in part on the first phase configuration for a third subset of reflective elements and the second phase configuration for a fourth subset of reflective elements; and reflecting a second signal to the second device based at least in part on the first phase configuration for a fifth subset of reflective elements different than the third subset and the second phase configuration for a sixth subset of reflective elements different than the fourth subset, wherein receiving the signaling is based at least in part on reflecting the first signal and the second signal.

Aspect 10: The method of aspect 9, wherein the first signal and the second signal comprise SRSs, PRACH signals, or a combination thereof.

Aspect 11: The method of any of aspects 1 through 10, wherein the first device comprises an RIS.

Aspect 12: A method for wireless communication at a first device, comprising: receiving signaling indicating a transmission beam of a second device, the transmission beam corresponding to an angle of arrival at a plurality of reflective elements of the first device and an angle of departure from the plurality of reflective elements: identifying, based at least in part on the angle of arrival and the angle of departure, a first subset of reflective elements corresponding to a first phase configuration and a second subset of reflective elements corresponding to a second phase configuration; and reflecting one or more signals from the second device based at least in part on the first phase configuration for the first subset of reflective elements and the second phase configuration for the second subset of reflective elements.

Aspect 13: The method of aspect 12, wherein receiving the signaling indicating the transmission beam comprises: receiving signaling indicating an index associated with the transmission beam of the second device from a plurality of transmission beams of the second device.

Aspect 14: The method of aspect 12, wherein receiving the signaling indicating the transmission beam comprises: receiving signaling indicating a summation associated with the angle of arrival and the angle of departure of the transmission beam.

Aspect 15: The method of any of aspects 12 through 14, wherein the transmission beam corresponds to a horizontal angle of arrival at the plurality of reflective elements, a vertical angle of arrival at the plurality of reflective elements, a horizontal angle of departure from the plurality of reflective elements, and a vertical angle of departure from the plurality of reflective elements; and receiving the signaling indicating the transmission beam comprises receiving a first summation associated with the horizontal angle of arrival, the vertical angle of arrival, the horizontal angle of departure, and the vertical angle of departure and a second summation associated with the vertical angle of arrival and the vertical angle of departure.

Aspect 16: The method of any of aspects 12 through 15, further comprising: transmitting signaling indicating a capability of the first device, wherein receiving the signaling indicating the transmission beam of the second device is based at least in part on transmitting the signaling indicating the capability of the first device.

Aspect 17: The method of aspect 16, wherein transmitting the signaling indicating the capability of the first device comprises: transmitting signaling indicating that each of the plurality of reflective elements have the first phase configuration or the second phase configuration, signaling indicating a quantity of the plurality of reflective elements, or both.

Aspect 18: The method of any of aspects 12 through 17, further comprising: reflecting a first signal to the second device based at least in part on the first phase configuration for a third subset of reflective elements and the second phase configuration for a fourth subset of reflective elements; and reflecting a second signal to the second device based at least in part on the first phase configuration for a fifth subset of reflective elements different than the third subset and the second phase configuration for a sixth subset of reflective elements different than the fourth subset, wherein receiving the signaling indicating the transmission beam of the second device is based at least in part on reflecting the first signal and the second signal.

Aspect 19: The method of aspect 18, wherein the first signal and the second signal comprise SRSs, PRACH signals, or a combination thereof.

Aspect 20: The method of any of aspects 12 through 19, wherein the first device comprises an RIS.

Aspect 21: A method for wireless communication at a first device, comprising: transmitting signaling to a second device comprising a plurality of reflective elements, the signaling indicating a first subset of reflective elements corresponding to a first phase configuration and a second subset of reflective elements corresponding to a second phase configuration, wherein the first subset of reflective elements and the second subset of reflective elements comprise interleaved reflective elements of the plurality of reflective elements; and transmitting one or more signals to the second device based at least in part on the first phase configuration for the first subset of reflective elements and the second phase configuration for the second subset of reflective elements.

Aspect 22: The method of aspect 21, wherein transmitting the signaling comprises: transmitting the signaling indicating a ratio of a first quantity of reflective elements in the first subset and a second quantity of reflective elements in the second subset.

Aspect 23: The method of aspect 22, further comprising: transmitting a set of integers corresponding to preconfigured ratio values, wherein transmitting the signaling indicating the ratio comprises transmitting an indication of a first integer of the ratio from the set of integers and a second integer of the ratio from the set of integers, the first integer associated with the first subset and the second integer associated with the second subset.

Aspect 24: The method of aspect 22, wherein transmitting the signaling indicating the ratio comprises: transmitting a first integer of the ratio associated with the first subset and a second integer of the ratio associated with the second subset.

Aspect 25: The method of aspect 22, wherein transmitting the signaling indicating the ratio comprises: transmitting a first integer of the ratio associated with the first subset and a second integer indicating a difference between the first integer and a third integer of the ratio associated with the second subset.

Aspect 26: The method of any of aspects 22 through 25, wherein the ratio comprises a first quantity of reflective elements from the first subset of reflective elements and a second quantity of reflective elements from the second subset of reflective elements; and the interleaved reflective elements comprise the first quantity of reflective elements having the first phase configuration interleaved with the second quantity of reflective elements having the second phase configuration.

Aspect 27: The method of any of aspects 21 through 26, further comprising: receiving signaling indicating a capability of the second device, wherein transmitting the signaling indicating the first subset and the second subset is based at least in part on receiving the signaling indicating the capability of the first device.

Aspect 28: The method of aspect 27, wherein receiving the signaling indicating the capability of the first device comprises: receiving signaling indicating that each of the plurality of reflective elements have the first phase configuration or the second phase configuration, signaling indicating a quantity of the plurality of reflective elements, or both.

Aspect 29: The method of any of aspects 21 through 28, further comprising: receiving a first signal reflected by the second device based at least in part on the first phase configuration for a third subset of reflective elements and the second phase configuration for a fourth subset of reflective elements; and receiving a second signal reflected by the second device based at least in part on the first phase configuration for a fifth subset of reflective elements different than the third subset and the second phase configuration for a sixth subset of reflective elements different than the fourth subset, wherein transmitting the signaling is based at least in part on reflecting the first signal and the second signal.

Aspect 30: The method of aspect 29, wherein the first signal and the second signal comprise SRSs, PRACH signals, or a combination thereof.

Aspect 31: The method of any of aspects 21 through 30, wherein the second device comprises an RIS.

Aspect 32: A method for wireless communication at a first device, comprising: transmitting signaling indicating a transmission beam of the first device, the transmission beam corresponding to an angle of arrival at a plurality of reflective elements of a second device and an angle of departure from the plurality of reflective elements; and transmitting, to the second device, one or more signals via the transmission beam based at least in part on transmitting the signaling indicating the transmission beam.

Aspect 33: The method of aspect 32, wherein transmitting the signaling indicating the transmission beam comprises: transmitting signaling indicating an index associated with the transmission beam of the first device from a plurality of transmission beams of the first device.

Aspect 34: The method of aspect 32, wherein transmitting the signaling indicating the transmission beam comprises: transmitting signaling indicating a summation associated with the angle of arrival and the angle of departure of the transmission beam.

Aspect 35: The method of any of aspects 32 through 34, wherein the transmission beam corresponds to a horizontal angle of arrival at the plurality of reflective elements, a vertical angle of arrival at the plurality of reflective elements, a horizontal angle of departure from the plurality of reflective elements, and a vertical angle of departure from the plurality of reflective elements; and transmitting the signaling indicating the transmission beam comprises transmitting a first summation associated with the horizontal angle of arrival, the vertical angle of arrival, the horizontal angle of departure, and the vertical angle of departure and a second summation associated with the vertical angle of arrival and the vertical angle of departure.

Aspect 36: The method of any of aspects 32 through 35, further comprising: receiving signaling indicating a capability of the second device, wherein transmitting the signaling indicating the transmission beam of the first device is based at least in part on receiving the signaling indicating the capability of the second device.

Aspect 37: The method of aspect 36, wherein receiving the signaling indicating the capability of the second device comprises: receiving signaling indicating that each of the plurality of reflective elements have a first phase configuration or a second phase configuration, signaling indicating a quantity of the plurality of reflective elements, or both.

Aspect 38: The method of any of aspects 32 through 37, further comprising: receiving a first signal reflected by the second device based at least in part on a first phase configuration for a first subset of reflective elements and a second phase configuration for a second subset of reflective elements, wherein the first subset of reflective elements and the second subset of reflective elements comprise interleaved reflective elements of the plurality of reflective elements of the second device; and receiving a second signal reflected by the second device based at least in part on the first phase configuration for a third subset of reflective elements different than the first subset and the second phase configuration for a fourth subset of reflective elements different than the second subset, wherein transmitting the signaling indicating the transmission beam of the first device is based at least in part on receiving the first signal and the second signal.

Aspect 39: The method of aspect 38, wherein the first signal and the second signal comprise SRSs, PRACH signals, or a combination thereof.

Aspect 40: The method of any of aspects 32 through 39, wherein the second device comprises an RIS.

Aspect 41: An apparatus for wireless communication at a first device comprising a plurality of reflective elements, comprising a processor: memory coupled with the processor; and instructions stored in the memory and executable by the processor to cause the apparatus to perform a method of any of aspects 1 through 11.

Aspect 42: An apparatus for wireless communication at a first device comprising a plurality of reflective elements, comprising at least one means for performing a method of any of aspects 1 through 11.

Aspect 43: A non-transitory computer-readable medium storing code for wireless communication at a first device comprising a plurality of reflective elements, the code comprising instructions executable by a processor to perform a method of any of aspects 1 through 11.

Aspect 44: An apparatus for wireless communication at a first device, comprising a processor: memory coupled with the processor; and instructions stored in the memory and executable by the processor to cause the apparatus to perform a method of any of aspects 12 through 20.

Aspect 45: An apparatus for wireless communication at a first device, comprising at least one means for performing a method of any of aspects 12 through 20.

Aspect 46: A non-transitory computer-readable medium storing code for wireless communication at a first device, the code comprising instructions executable by a processor to perform a method of any of aspects 12 through 20.

Aspect 47: An apparatus for wireless communication at a first device, comprising a processor: memory coupled with the processor; and instructions stored in the memory and executable by the processor to cause the apparatus to perform a method of any of aspects 21 through 31.

Aspect 48: An apparatus for wireless communication at a first device, comprising at least one means for performing a method of any of aspects 21 through 31.

Aspect 49: A non-transitory computer-readable medium storing code for wireless communication at a first device, the code comprising instructions executable by a processor to perform a method of any of aspects 21 through 31.

Aspect 50: An apparatus for wireless communication at a first device, comprising a processor: memory coupled with the processor; and instructions stored in the memory and executable by the processor to cause the apparatus to perform a method of any of aspects 32 through 40.

Aspect 51: An apparatus for wireless communication at a first device, comprising at least one means for performing a method of any of aspects 32 through 40.

Aspect 52: A non-transitory computer-readable medium storing code for wireless communication at a first device, the code comprising instructions executable by a processor to perform a method of any of aspects 32 through 40.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a first device comprising a plurality of reflective elements, the method comprising:

receiving signaling indicating a first subset of reflective elements corresponding to a first phase configuration and a second subset of reflective elements corresponding to a second phase configuration, wherein the first subset of reflective elements and the second subset of reflective elements comprise interleaved reflective elements of the plurality of reflective elements; and reflecting one or more signals from a second device based at least in part on the first phase configuration for the first subset of reflective elements and the second phase configuration for the second subset of reflective elements.

2. The method of claim 1, wherein receiving the signaling comprises:

receiving the signaling indicating a ratio of a first quantity of reflective elements in the first subset and a second quantity of reflective elements in the second subset.

3. The method of claim 2, further comprising:

receiving an indication of a set of integers corresponding to preconfigured ratio values, wherein receiving the signaling indicating the ratio comprises receiving an indication of a first integer of the ratio from the set of integers and a second integer of the ratio from the set of integers, the first integer associated with the first subset and the second integer associated with the second subset.

4. The method of claim 2, wherein receiving the signaling indicating the ratio comprises:

receiving a first integer of the ratio associated with the first subset and a second integer of the ratio associated with the second subset.

5. The method of claim 2, wherein receiving the signaling indicating the ratio comprises:

receiving a first integer of the ratio associated with the first subset and a second integer indicating a difference between the first integer and a third integer of the ratio associated with the second subset.

6. The method of claim 2, wherein:

the ratio comprises a first quantity of reflective elements from the first subset of reflective elements and a second quantity of reflective elements from the second subset of reflective elements; and the interleaved reflective elements comprise the first quantity of reflective elements having the first phase configuration interleaved with the second quantity of reflective elements having the second phase configuration.

7. The method of claim 1, further comprising:

transmitting signaling indicating a capability of the first device, wherein receiving the signaling indicating the first subset and the second subset is based at least in part on the signaling indicating the capability of the first device.

8. The method of claim 7, wherein transmitting the signaling indicating the capability of the first device comprises:

transmitting signaling indicating that each of the plurality of reflective elements have the first phase configuration or the second phase configuration, or a quantity of the plurality of reflective elements, or both.

9. The method of claim 1, further comprising:

reflecting a first signal to the second device based at least in part on the first phase configuration for a third subset of reflective elements and the second phase configuration for a fourth subset of reflective elements; and reflecting a second signal to the second device based at least in part on the first phase configuration for a fifth subset of reflective elements different than the third subset and the second phase configuration for a sixth subset of reflective elements different than the fourth subset, wherein receiving the signaling is based at least in part on reflecting the first signal and the second signal.

10. The method of claim 9, wherein the first signal and the second signal comprise sounding reference signals, physical random access channel signals, or a combination thereof.

11. The method of claim 1, wherein the first device comprises a reconfigurable intelligent surface.

12. A method for wireless communication at a first device, comprising:

receiving signaling indicating a transmission beam of a second device, the transmission beam corresponding to an angle of arrival at a plurality of reflective elements of the first device and an angle of departure from the plurality of reflective elements;

identifying, based at least in part on the angle of arrival and the angle of departure, a first subset of reflective elements corresponding to a first phase configuration and a second subset of reflective elements corresponding to a second phase configuration; and reflecting one or more signals from the second device based at least in part on the first phase configuration for the first subset of reflective elements and the second phase configuration for the second subset of reflective elements.

13. The method of claim 12, wherein receiving the signaling indicating the transmission beam comprises:

receiving signaling indicating an index associated with the transmission beam of the second device from a plurality of transmission beams of the second device.

14. The method of claim 12, wherein receiving the signaling indicating the transmission beam comprises:

receiving signaling indicating a summation associated with the angle of arrival and the angle of departure of the transmission beam.

15. The method of claim 12, wherein:

the transmission beam corresponds to a horizontal angle of arrival at the plurality of reflective elements, a vertical angle of arrival at the plurality of reflective elements, a horizontal angle of departure from the plurality of reflective elements, and a vertical angle of departure from the plurality of reflective elements; and receiving the signaling indicating the transmission beam comprises receiving a first summation associated with the horizontal angle of arrival, the vertical angle of arrival, the horizontal angle of departure, and the vertical angle of departure and a second summation associated with the vertical angle of arrival and the vertical angle of departure.

16. The method of claim 12, further comprising:

transmitting signaling indicating a capability of the first device, wherein receiving the signaling indicating the transmission beam of the second device is based at least in part on transmitting the signaling indicating the capability of the first device.

17. The method of claim 16, wherein transmitting the signaling indicating the capability of the first device comprises:

transmitting signaling indicating that each of the plurality of reflective elements have the first phase configuration or the second phase configuration, signaling indicating a quantity of the plurality of reflective elements, or both.

18. The method of claim 12, further comprising:

reflecting a first signal to the second device based at least in part on the first phase configuration for a third subset of reflective elements and the second phase configuration for a fourth subset of reflective elements; and reflecting a second signal to the second device based at least in part on the first phase configuration for a fifth subset of reflective elements different than the third subset and the second phase configuration for a sixth subset of reflective elements different than the fourth subset, wherein receiving the signaling indicating the transmission beam of the second device is based at least in part on reflecting the first signal and the second signal.

19. The method of claim 18, wherein the first signal and the second signal comprise sounding reference signals, physical random access channel signals, or a combination thereof.

20. The method of claim 12, wherein the first device comprises a reconfigurable intelligent surface.

21. A method for wireless communication at a first device, comprising:

transmitting signaling to a second device comprising a plurality of reflective elements, the signaling indicating a first subset of reflective elements corresponding to a first phase configuration and a second subset of reflective elements corresponding to a second phase configuration, wherein the first subset of reflective elements and the second subset of reflective elements comprise interleaved reflective elements of the plurality of reflective elements; and transmitting one or more signals to the second device based at least in part on the first phase configuration for the first subset of reflective elements and the second phase configuration for the second subset of reflective elements.

22. The method of claim 21, wherein transmitting the signaling comprises:

transmitting the signaling indicating a ratio of a first quantity of reflective elements in the first subset and a second quantity of reflective elements in the second subset.

23. The method of claim 22, further comprising:

transmitting a set of integers corresponding to preconfigured ratio values, wherein transmitting the signaling indicating the ratio comprises transmitting an indication of a first integer of the ratio from the set of integers and a second integer of the ratio from the set of integers, the first integer associated with the first subset and the second integer associated with the second subset.

24. The method of claim 22, wherein transmitting the signaling indicating the ratio comprises:

transmitting a first integer of the ratio associated with the first subset and a second integer of the ratio associated with the second subset.

25. The method of claim 22, wherein transmitting the signaling indicating the ratio comprises:

transmitting a first integer of the ratio associated with the first subset and a second integer indicating a difference between the first integer and a third integer of the ratio associated with the second subset.

26. The method of claim 22, wherein:

the ratio comprises a first quantity of reflective elements from the first subset of reflective elements and a second quantity of reflective elements from the second subset of reflective elements; and the interleaved reflective elements comprise the first quantity of reflective elements having the first phase configuration interleaved with the second quantity of reflective elements having the second phase configuration.

27. A method for wireless communication at a first device, comprising:

transmitting signaling indicating a transmission beam of the first device, the transmission beam corresponding to an angle of arrival at a plurality of reflective elements of a second device and an angle of departure from the plurality of reflective elements; and transmitting, to the second device, one or more signals via the transmission beam based at least in part on transmitting the signaling indicating the transmission beam.

28. The method of claim 27, wherein transmitting the signaling indicating the transmission beam comprises:

transmitting signaling indicating an index associated with the transmission beam of the first device from a plurality of transmission beams of the first device.

29. The method of claim 27, wherein transmitting the signaling indicating the transmission beam comprises:

transmitting signaling indicating a summation associated with the angle of arrival and the angle of departure of the transmission beam.

30. The method of claim 27, wherein:

the transmission beam corresponds to a horizontal angle of arrival at the plurality of reflective elements, a vertical angle of arrival at the plurality of reflective elements, a horizontal angle of departure from the plurality of reflective elements, and a vertical angle of departure from the plurality of reflective elements; and transmitting the signaling indicating the transmission beam comprises transmitting a first summation associated with the horizontal angle of arrival, the vertical angle of arrival, the horizontal angle of departure, and the vertical angle of departure and a second summation associated with the vertical angle of arrival and the vertical angle of departure.

\* \* \* \* \*